(12) United States Patent
Beaven et al.

(10) Patent No.: US 9,785,632 B1
(45) Date of Patent: Oct. 10, 2017

(54) BEACON-BASED TRANSLATION FOR SMART SIGNS

(71) Applicant: Xevo Inc., Kirkland, WA (US)

(72) Inventors: Travis Lee Beaven, Woodinville, WA (US); Christi Teresa McCorkle, Orlando, FL (US)

(73) Assignee: Xevo Inc., Kirkland, WA (US)

( * ) Notice: Subject to any disclaimer, the term of this patent is extended or adjusted under 35 U.S.C. 154(b) by 0 days.

(21) Appl. No.: 15/153,542

(22) Filed: May 12, 2016

(51) Int. Cl.
*G06F 17/28* (2006.01)
*G06T 3/00* (2006.01)
*H04W 8/20* (2009.01)
*H04W 4/00* (2009.01)

(52) U.S. Cl.
CPC ........ *G06F 17/2809* (2013.01); *G06F 17/289* (2013.01); *G06T 3/0006* (2013.01); *H04W 4/008* (2013.01); *H04W 8/205* (2013.01)

(58) Field of Classification Search
CPC ....................................................... G06F 17/28
USPC ......................................................... 704/2–8
See application file for complete search history.

(56) References Cited

U.S. PATENT DOCUMENTS

| | | | |
|---|---|---|---|
| 9,047,054 B1 | 6/2015 | Goldstein et al. | |
| 9,471,567 B2 * | 10/2016 | Duyaguit | G06F 17/275 |
| 2009/0138353 A1 | 5/2009 | Mendelson | |
| 2010/0291968 A1 * | 11/2010 | Ander | G09B 21/009 |
| | | | 455/556.1 |
| 2011/0183644 A1 | 7/2011 | Gupta | |
| 2013/0099919 A1 | 4/2013 | Cai et al. | |
| 2013/0165151 A1 * | 6/2013 | Gits | H04W 4/023 |
| | | | 455/456.3 |
| 2014/0159910 A1 | 6/2014 | Lee et al. | |
| 2015/0287295 A1 | 10/2015 | Trivelpiece et al. | |
| 2016/0037924 A1 * | 2/2016 | Bromley | F16M 11/10 |
| | | | 211/26 |
| 2016/0180663 A1 | 6/2016 | McMahan et al. | |
| 2016/0203643 A1 * | 7/2016 | Kim | G06T 19/003 |
| | | | 345/633 |
| 2016/0284174 A1 | 9/2016 | Connell, II | |

* cited by examiner

*Primary Examiner* — Jesse Pullias
(74) *Attorney, Agent, or Firm* — Seed Intellectual Property Law Group LLP

(57) ABSTRACT

Embodiments are directed towards providing a smart sign that dynamically translates content that is displayed on the sign based on a preferred language of mobile devices that are in close proximity to the sign. The smart sign determines when one or more mobile devices are in proximity to the smart sign. The smart sign communicates with each of these mobile devices to determine a preferred language of a respective user of each mobile device. The smart sign translates and displays the content in each of the preferred languages on the sign. In various embodiments, the smart sign can relocate or resize the translated content so that it can fit on a display screen of the smart sign relative to a location of the mobile devices relative to the smart sign.

28 Claims, 17 Drawing Sheets

BEACON-BASED TRANSLATION FOR SMART SIGNS

BACKGROUND

Technical Field

The present disclosure relates generally to the dynamic, real-time translation and display of content on a smart sign based on the language of users in proximity to the sign.

Description of the Related Art

Electronic display signs are quickly replacing traditional posters and billboards as the primary way to provide information to people. Many new malls, stores, airports, stadiums, arenas, sporting venues, zoos, amusement parks, and other public places are being equipped with electronic display signs rather than relying on paper posters and billboards to convey information to the public. These electronic display signs allow an advertiser or merchant to change the information that is being displayed from week-to-week, day-to-day, or even hour-to-hour, but the information is often static and targeted to a general audience while it is being displayed. It is with respect to these and other considerations that the embodiments described herein have been made.

BRIEF SUMMARY

Briefly stated, embodiments are directed towards providing a smart sign that dynamically translates content that is displayed on the sign based on a preferred language of mobile devices that are in close proximity to the sign. The smart sign determines when one or more mobile devices are in proximity to the smart sign, e.g., within a proximity area or field-of-view of the smart sign. The smart sign communicates with each of these mobile devices to determine a preferred language of a respective user of each mobile device. The smart sign translates or selects translated content and displays the content in each of the preferred languages on the sign. In various embodiments, the smart sign can relocate or resize the translated content so that it can fit on a display screen of the smart sign.

In one embodiment, if a number of preferred languages of the mobile devices in proximity to the smart sign exceeds a first threshold value, then a non-text version, or graphics-only version, of the content may be displayed rather than each separate translation. In another embodiment, if the number of preferred languages exceeds a second threshold value that is smaller than the first threshold value, then a partial version of the translated content is displayed. The use of partial versions or a non-text version of the content can be useful when the number of languages to be displayed on the smart sign would cause overcrowding of the content on the sign or would make the content too small to be viewable by the users.

In some embodiments, the smart sign stores the content and each translation of the content in a local memory and selects the translated content based on the preferred languages. In other embodiments, the smart sign performs real-time translations of the content or receives the translated content from a real-time translation server. If there are no mobile devices in the proximity of the smart sign, if a preferred language is not received from the mobile devices in the proximity of the smart sign, or if the mobile devices exit the proximity of the sign, then the smart sign displays the content in the default language.

In some embodiments, the smart sign also determines a location or distance of the mobile devices relative to the smart sign. At least one visual characteristic of the translated content is modified based on the location of the mobile devices. Modifying the visual characteristic may include, but is not limited to, modifying a graphical position at which to display the translated content, changing the display size or color of the translated content, changing the amount of translated content to display, or changing other characteristics or parameters of the content that effect how the translated content is displayed.

In various embodiments, a movement of the mobile devices within the proximity of the smart sign is determined. In some embodiments, the translated content can be rendered on the smart sign to track the movement of the mobile device. In other embodiments, the smart sign may provide the preferred language of that mobile device to a second smart sign so that the second smart sign can translate and display other content in the preferred language prior to the mobile device entering the proximity of the second smart sign. Similarly, the smart sign can receive an indication, along with a preferred language, that a mobile device is moving towards the smart sign, such as from another smart sign or the real-time translation server. The smart sign can translate its content and determine a graphical position at which to display the translated content based on the movement of the mobile device towards the smart sign.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
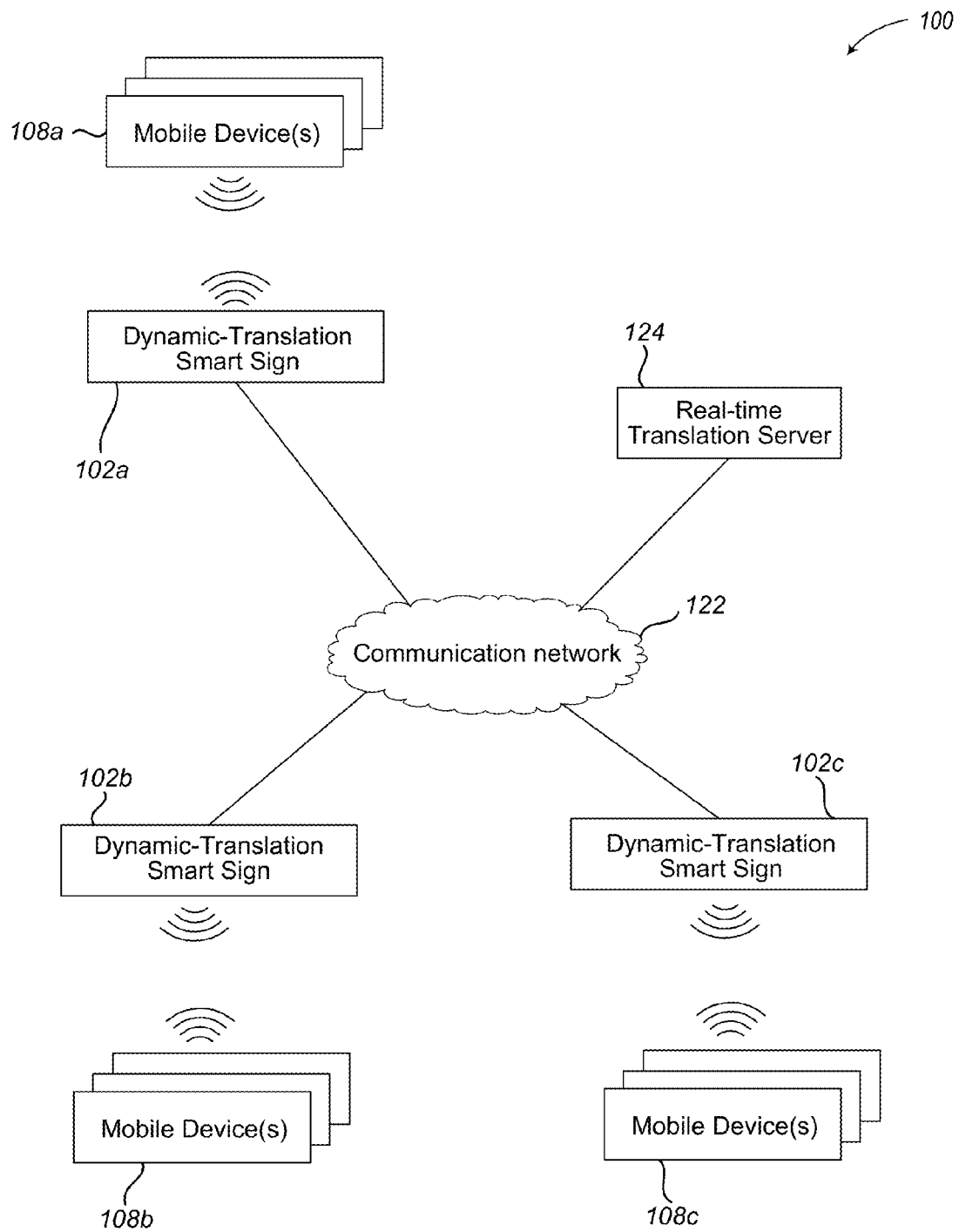
FIG. 1 illustrates a context diagram of an environment that utilizes a plurality of dynamic-translation smart signs to provide real-time translations of content that is being displayed on those smart signs in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The terms "smart sign," dynamic-translation smart sign," "electronic display sign," or "sign" refer to a display device that can detect mobile devices that are in a close proximity to the device and dynamically change the content being displayed on the device based on a preferred language or other characteristics of the detected mobile devices. Smart signs may be standalone devices or they may be combined with other electronic devices, and they may be employed in a variety of different situations, settings, or environments. For example, in some embodiments, smart signs may include freestanding or wall hanging smart signs used in malls, stores, airports, stadiums, arenas, sporting venues, zoos, amusement parks, hotel lobbies, cruise ships, retail shops, or other locations where information is provided to people. In some other embodiments, the smart signs may be utilized in other electronic devices, such as, but not limited to, a head unit in an automobile, a television in a hotel room or cruise-ship cabin, a heads-up display in an airplane seat, or other electronic devices.

The term "content" refers to information that can be displayed on a smart sign. Content may include visual content, such as, but is not limited to, text, graphics, video, or other information that is provided to a user on the smart sign. In some embodiments, the content may also include audio content. Examples of content can include, but are not limited to, advertisements, athlete information, directions, restaurant menus, descriptive information, emergency instructions, etc.

FIG. 1 illustrates a context diagram of an environment that utilizes a plurality of dynamic-translation smart signs to provide real-time translations of content that is being displayed on those smart signs in accordance with embodiments described herein. Environment 100 includes a real-time translation server 124 and one or more dynamic-translation smart signs 102a-102c.

Each dynamic-translation smart sign 102 can communicate with one or more mobile devices 108 as those mobile devices enter or come into close proximity to a dynamic-translation smart sign 102. In the illustration, dynamic-translation smart sign 102a is communicating with mobile devices 108a, dynamic-translation smart sign 102b is communicating with mobile devices 108b, and dynamic-translation smart sign 102c is communicating with mobile devices 108c. It should be understood that at any given point in time, a dynamic-translation smart sign 102 may be communicating with zero, one, or a plurality of mobile devices that are in proximity to the respective dynamic-translation smart sign 102.

The dynamic-translation smart signs 102 obtain device-specific information, including a preferred language, from the mobile devices 108. The dynamic-translation smart signs 102 utilize the preferred language of each mobile device 108 that is in its proximity to translate and display content. The dynamic-translation smart signs 102 can perform real-time translations on pre-stored content, perform real-time translations on content that is received from the real-time translation server 124, select pre-stored translated content, or display content that was translated and provided by the real-time translation server 124.

In various embodiments, the dynamic-translation smart signs 102 may also determine a location of each mobile device 108. For example, dynamic-translation smart sign 102a determines the location of mobile devices 108a relative to dynamic translation smart sign 102a, dynamic-translation smart sign 102b determines the location of mobile devices 108b relative to dynamic translation smart sign 102b, and dynamic-translation smart sign 102c determines the location of mobile devices 108c relative to dynamic translation smart sign 102c. Each dynamic-translation smart sign 102 utilizes this location information to modify one or more visual characteristics of the translated content, including, but not limited to determining a graphical display position or size to render the translated content for the corresponding mobile devices 108.

The dynamic-translation smart signs 102 and the real-translation server 124 communicate with each other via a communication network 122. The communication network 122 is configured to couple various computing devices to transmit data from one or more devices to one or more other devices. Communication network 122 includes various wired or wireless networks that may be employed using various forms of communication technologies and topologies, such as, but not limited to, cellular networks, mesh networks, or the like.

In various embodiments, a dynamic-translation smart sign 102 can provide information regarding the mobile devices in its proximity to the real-time translation server 124 via communication network 122. Examples of such information may include, but are not limited to, the preferred languages of the mobile devices, number of mobile devices for each preferred language, or other information associated with the translation of content to be displayed on the smart sign. In some embodiments, the real-time translation server 124 can provide content or translated content, instructions on which content or translated content to display, instructions on how to display content or translated content, or other information to one or more of the dynamic-translation smart signs 102a-102c via the communication network 122. In yet other embodiments, dynamic-translation smart signs 102 may communicate with each other via the communication network 122 to communicate the preferred languages of mobile devices that may enter the proximity of another smart sign so that that other smart sign can translate and display the content prior to the mobile device entering its proximity.

Figure 2A:
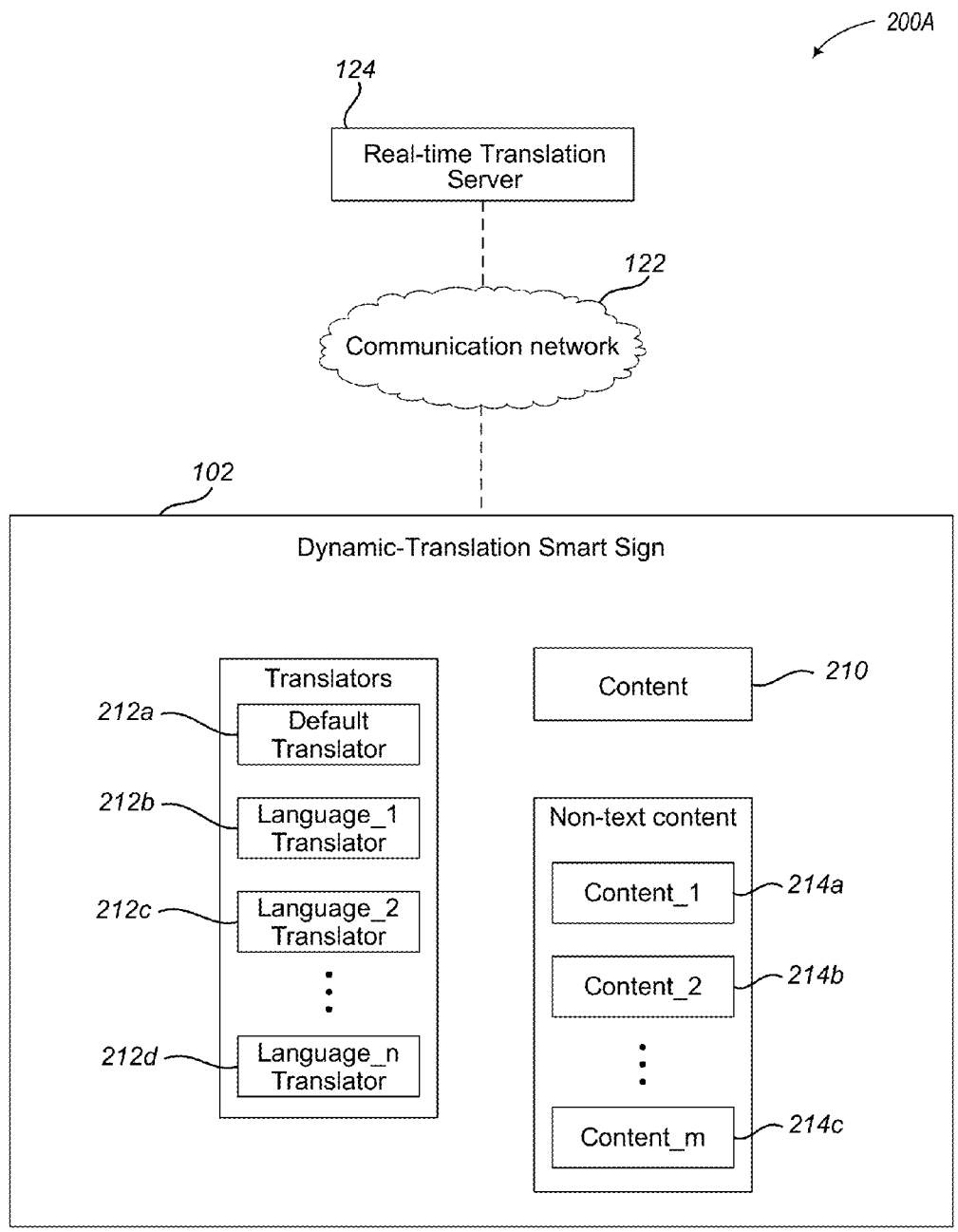
FIGS. 2A-2B show use case examples of the content stored by a dynamic-translation smart sign in accordance with embodiments described herein.
Figure 2B:
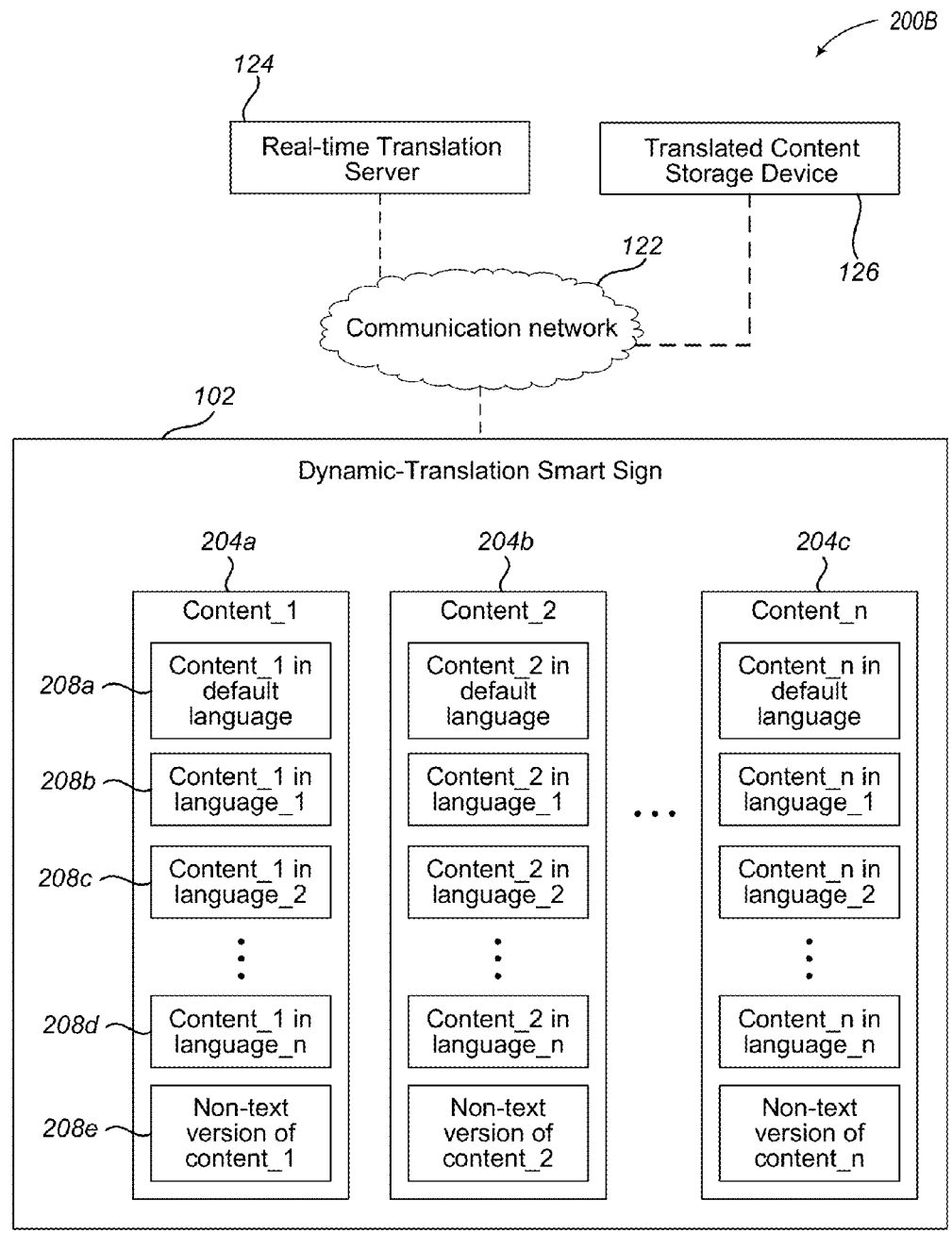

FIGS. 2A-2B show use case examples of the content stored by a dynamic-translation smart sign in accordance with embodiments described herein.

FIG. 2A illustrates an example system 200A where a dynamic-translation smart sign 102 performs real-time translations on content 210 that is to be rendered on a display screen or display device of the dynamic-translation smart sign 102. The content 210 may be in a default language of the dynamic-translation smart sign 102 or it may be in some other language. In some embodiments, the dynamic-translation smart sign 102 stores the content 210 locally on the dynamic-translation smart sign 102. In other embodiments, the content 210 is received from the real-time translation server 124 and displayed on the dynamic-translation smart sign 102 as it is received.

In some embodiments, the dynamic-translation smart sign 102 is assigned a default language, which may be pre-stored on the dynamic-translation smart sign 102 or assigned by the real-time translation server 124. In some embodiments, the real-time translation server 124 may change or update the default language to a different language. In other embodiments, the default language may be updated or changed based on a number mobile devices associated with a particular language being above a threshold value over a given period of time. For example, the default language may be originally set to English, but may be changed to German if 80% of the mobile devices that are in proximity to the dynamic-translation smart sign 102 over a two day period have a preferred language of German.

The dynamic-translation smart sign 102 includes a plurality of translators 212a-212d. The translators include one or more machine translators that can translate the content 210 into multiple different languages based on the preferred language of the mobile devices that are in proximity to the dynamic-translation smart sign 102. Since the dynamic-translation smart sign 102 may have a default language and the content 210 may be in a different language than the default language, the translators 212 may include a default language translator 212a and a plurality of other language translators 212b-212d.

In some embodiments, the dynamic-translation smart sign 102 may store in memory a predetermined number of translators 212a-212d. If the dynamic-translation smart sign 102 does not have a translator for a preferred language received from a mobile device, then the dynamic-translation smart sign 102 may request the translator for that preferred language from the real-time translation server 124. In various embodiments, the dynamic-translation smart sign 102 may only requests the translator for a particular language after the dynamic-translation smart sign 102 has received that language as the preferred language from a predetermined number of mobile devices 108. In some embodiments, the dynamic-translation smart sign 102 may display a non-text version of the content until it downloads or otherwise receives the translator from the real-time translation server 124. In at least one embodiment, the dynamic-translation smart sign 102 may have enough storage capacity for a limited number of translators 212. Accordingly, the dynamic-translation smart sign 102 can remove or otherwise delete the least used translator from memory to make room for the new translator.

The dynamic-translation smart sign 102 also stores non-text content 214a-214c. In some embodiments, the non-text content 214 includes a non-text version of the content 210, such as an image, logo, arrows, or other graphics. In other embodiments, the non-text content 214 may include audio or video clips that can be output rather than the translated content.

In various embodiments, the dynamic-translation smart sign 102 may be enabled to perform translations as described herein without a connection to the communication network 122 and the real-time translation server 124.

Although FIG. 2A illustrates the content 210, the translators 212, and the non-text content 214 as being stored on the dynamic-translation smart sign 102, embodiments are not so limited. In other embodiments, the content 210, the translators 212, and the non-text content 214 may be stored on the real-time translation server 124. In such an embodiment, the dynamic-translation smart sign 102 determines the preferred languages of mobile devices that are in proximity to the dynamic-translation smart sign 102 and provides them to the real-time translation server 124. The real-time translation server 124 performs the appropriate translations based on the preferred languages and provides the translated content to the dynamic-translation smart sign 102 for display.

FIG. 2B illustrates an example system 200B, which is similar to what is illustrated in FIG. 2A, but where the dynamic-translation smart sign 102 stores different versions of the content in different languages and selects the appropriate version rather than performing machine translations on the content. In some embodiments, the dynamic-translation smart sign 102 may store a single content item, such as content 204a, or a plurality of content items, such as content 204a-204c. Examples, of content 204a-204c may include, but are not limited to, different advertisements, information for different athletes or players, different emergency instructions, etc.

Content 204 can include a plurality of versions 208 of the corresponding content. For example, the plurality of versions 208 may include the content in a default language 208a, one or more languages 208b-208d, and a non-text version 208e. In various embodiments, default language 208a and one or more languages 208b-208d may include full versions of the content or partial versions of the content, or both. As described elsewhere herein, selection of the full version or partial version of the content may be based on the number of different preferred languages of the mobile devices in proximity to the dynamic-translation smart sign 102 or based on the size of the content to be displayed, or both.

The dynamic-translation smart sign 102 selects which version 208 of the content 204 to display based on the mobile devices that are in proximity to the dynamic-translation smart sign 102. In various embodiments, the real-time translation server 124 instructs the dynamic-translation smart sign 102 on which content 204 to select and display. For example, assume content 204a-204c is player information for different players in a sporting event. The real-time translation server 124 can determine which players are currently on the field and provide that information to the dynamic-translation smart sign 102. The dynamic-translation smart sign 102 then selects and displays the content 204 for those players in the appropriate version 208 based on the determined preferred languages. In some embodiments, the real-time translation server 124 instructs a plurality of dynamic-translation smart signs 102 on which content to select and display, but it is up to each corresponding dynamic-translation smart sign 102 to individually select the appropriate versions 208 of the selected content based on the preferred language of the mobile devices that are in proximity to that corresponding dynamic-translation smart sign 102.

In some embodiments, the dynamic-translation smart sign 102 may store in memory a predetermined number of versions 208. If the dynamic-translation smart sign 102 does not have a version 208 for a preferred language received from a mobile device, then the dynamic-translation smart sign 102 may request that version from translated content storage device 126. The translated content storage device 126 may store a plurality of versions of the content, where the dynamic-translation smart sign 102 may store a subset thereof. In various embodiments, the dynamic-translation smart sign 102 may only request a version in a different language after the dynamic-translation smart sign 102 has received that language as the preferred language from a predetermined number of mobile devices 108. In some embodiments, the dynamic-translation smart sign 102 may display a non-text version of the content until it downloads or otherwise receives the appropriate version from the translated content storage device 126. In at least one embodiment, the dynamic-translation smart sign 102 may have enough storage capacity for a limited number of content versions 208. Accordingly, the dynamic-translation smart sign 102 can remove or otherwise delete the least used version from memory to make room for the new version.

In various embodiments, the dynamic-translation smart sign 102 may be preloaded with all the content and versions to display translated content as described herein without a connection to the communication network 122, the real-time translation server 124, or the translated content storage device 126.

Although FIG. 2B illustrates the content 204 and each associated version 208 as being stored on the dynamic-translation smart sign 102, embodiments are not so limited. In other embodiments, the content 204 and each associated version 208 may be stored on the real-time translation server 124. In such an embodiment, the dynamic-translation smart sign 102 determines the preferred languages of mobile devices that are in proximity to the dynamic-translation smart sign 102 and provides them to the real-time translation server 124. The real-time translation server 124 selects the appropriate content 204 and versions 208 based on the preferred languages, and it provides the selected content to the dynamic-translation smart sign 102 for display. Additionally, the real-time translation server 124 may request other versions of the content from the translated content storage device 126 if it does not have an appropriate version for a preferred language of a mobile device. In at least one embodiment, the real-time translation server 124 may instruct the dynamic-translation smart sign 102 to display a non-text version of the content until it downloads or otherwise receives the appropriate version from the translated content storage device 126.

Figure 3A:
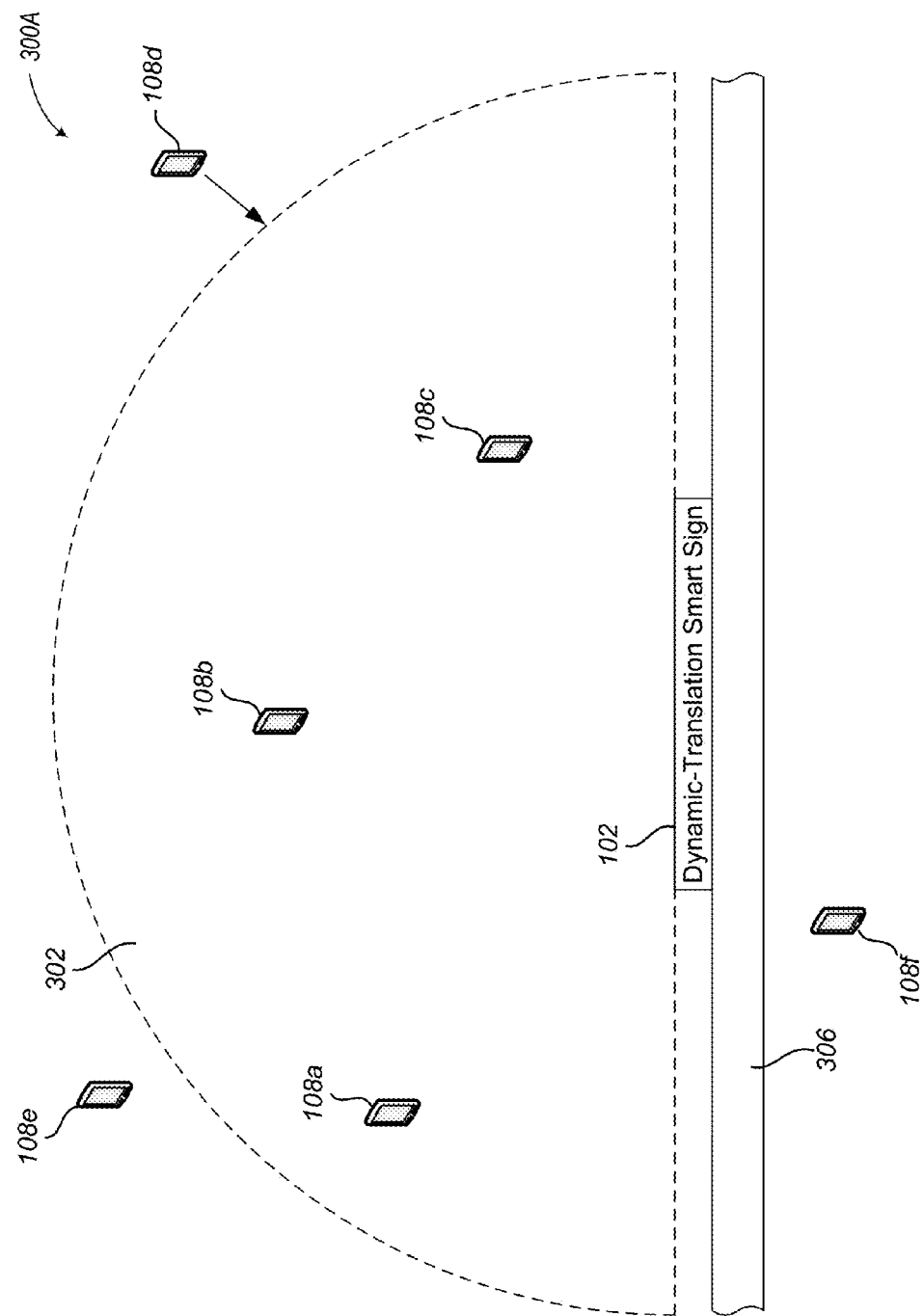
FIGS. 3A-3E show use case examples of a proximity area and a field-of-view area for a dynamic-translation smart sign in accordance with embodiments described here.

FIGS. 3A-3E show use case examples of a proximity area and field-of-view area of a dynamic-translation smart sign in accordance with embodiments described here. FIG. 3A illustrates an example 300A of a dynamic-translation smart sign 102 with a proximity area 302.

The proximity area 302 is a distance or area in which the smart sign 102 can detect, track, or communicate with a mobile device 108. The proximity area 302 may be defined or identified as a predetermined distance from the smart sign 102, an area defined relative to the smart sign 102, when a mobile device 108 is within communication range of the smart sign 102 via a short-range communication technology, or other spatial relationship between the smart sign 102 and the mobile device 108, or a combination thereof.

In some embodiments, the proximity area 302 may be defined as a distance from the smart sign 102. In at least one embodiment, the smart sign 102 can determine the distance or location of a mobile device 108 relative to the smart sign 102 using the round-trip time of communications sent between the smart sign 102 and the mobile device 108, ultrasonic sensors, or other sensors that detect a distance between two communicating devices known to one skilled in the art. This detected distance can then be compared to the distance that defines the proximity area 302, and if the detected distance is within the proximity area 302, then the mobile device is in the proximity of the smart sign, otherwise it is not.

In other embodiments, the proximity area 302 may be a defined spatial area in a particular position relative to the smart sign 108. For example, the proximity area may be defined as the area in front of the smart sign 102, but within a predefined radial distance away from the smart sign 102, such as is illustrated in FIG. 3A. In at least one embodiment, the smart sign 102 can determine if a mobile device 108 is within the proximity area 302 by employing one or more directional proximity detectors or sensors to determine a location of the mobile device 108 relative to the smart sign 102. In some embodiments, the relative location of each mobile device may be a radial angle or other coordinate system directions that have a corresponding graphical display location.

In yet other embodiments, the proximity area 302 may be defined as the area in which a mobile device 108 can communicate with the smart sign 108. In this way, a mobile device 108 is in proximity to the smart sign 102 when the mobile device 108 is within communication range of the smart sign 102 via a short-range communication technology. In various embodiments, the smart sign 102 is configured to receive signals from or communicate with mobile devices 108 via one or more short-range communication technologies, such as via Near Field Communication (NFC) protocols, Bluetooth Low Energy (BLE) protocols, Radio-frequency identification (RFID) technology, or other short-range communication technologies. Receipt of a message or signal from a mobile device 108 using a short-range communication technology may indicate that the mobile device 108 is in the proximity area 302 of the smart sign 102.

Various range and directional proximity detectors, sensors, devices, technologies, or mechanisms known to those skilled in the art can be used to logically define or identify the proximity area 302. It should be noted that one or more proximity detectors may be built into the smart sign 102 or positioned remote to the smart sign but in a way that can define the proximity area 302, such as in or on an adjacent or nearby wall, pillar, or fixture, or even in the ceiling or floor. Similarly, it should be noted that the proximity area 302 may take on various geometrical shapes, such as circular, semicircular, rectangular, triangular, or other polygons. The shape the proximity area 302 may be determined based on the type of sensors or technology used to detect or communicate with the mobile devices 108, the number of sensors used, or the positioning of the sensors relative to each other or the smart sign 102.

In various embodiments, the proximity area 302 may be preset by an administrator or determined by the smart sign. In at least one embodiment, the smart sign may utilize ultrasonic sensors, rangefinders, or other sensors to determine the environment around the smart sign, such as walls, hallways, etc., to determine the proximity area 302, such as at what distance or area can a user properly view the smart sign 102. In other embodiments, the smart sign can communicate with other smart signs to determine the proximity area 302. For example, each of a plurality of smart signs can be preset with its geographical location or they can use GPS or other location-based technologies to determine their respective geographical location. The smart signs can then coordinate their individual proximity area 302 such that they do not overlap or partially overlap depending on how the smart signs are arranged and the content that they are displaying.

In other embodiments, the proximity area 302 is pre-determined or set by an administrator based on the purpose of the smart sign 102, what content is being displayed on the smart sign 102, the location of the smart sign 102, or other environmental factors associated with the smart sign 102. For example, in some situations, the smart sign 102 may be in a location where it only wants to obtain the preferred language of mobile devices 108 that are directly in front of the smart sign but not behind the sign, such as in a hotel room or cruise-ship cabin. In this type of situation, the smart sign 102 would only want to obtain the preferred languages of mobile devices 108 in that particular room or cabin and not in an adjacent room or cabin, or even in the hall.

In other situations, the smart sign 102 may be in a location where it wants to obtain the preferred language of mobile devices are within a predetermined distance in all directions around the smart sign 102, such as in a football stadium. In this type of situation, the smart sign 102 may be positioned on a pillar in the middle of a corridor in the football stadium. In this example, the smart sign 102 may want to obtain the preferred languages of the mobile devices 108 that are all around the sign, even if a user of a mobile device 108 is not directly in front of the sign 102.

By collecting the preferred language of mobile devices 108 that are in the proximity area 302, whether in front of or behind the smart sign 102, the smart sign 102 can perform additional analytics or operations based on the obtained preferred languages. For example, in some embodiments, the smart sign 102 can pre-translate the content in anticipation of a mobile device 108 moving from behind the sign 102 to the front of the sign 102, the smart sign 102 can inform other smart signs of the preferred languages of mobile devices that may enter the proximity area of those other signs, or the smart sign 102 may modify its own default language based on those preferred languages, as described elsewhere herein.

As illustrated in FIG. 3A, the smart sign 102 is attached to a wall 306, such as in a hotel room. The illustrated proximity area 302 is an area that is substantially in front the smart sign 102 and has a specific radius from the center of the smart sign 102. In this example, the proximity area 302 is semicircular so as to detect mobile devices 108 that are substantially in front of the smart sign 102, but not behind the wall 306.

As shown, mobile devices 108a-108e are substantially in front of the smart sign 102 and mobile device 108f is behind the wall 306, such as in another room. In this case, mobile devices 108a-108c are within the proximity area 302 and can be detected or tracked by, or communicate with, the smart sign 102, while mobile devices 108d-108f are outside the proximity area 302 and cannot be detected or tracked by, or communicate with, the smart sign 102. Accordingly, the smart sign 102 is unaware of the presence or location of the mobile devices 108d-108f. However, if mobile device 108d is moving towards the smart sign 102, the smart sign 102 should be able to detect and communicate with the mobile device 108d once it enters the proximity area 302.

Figure 3B:
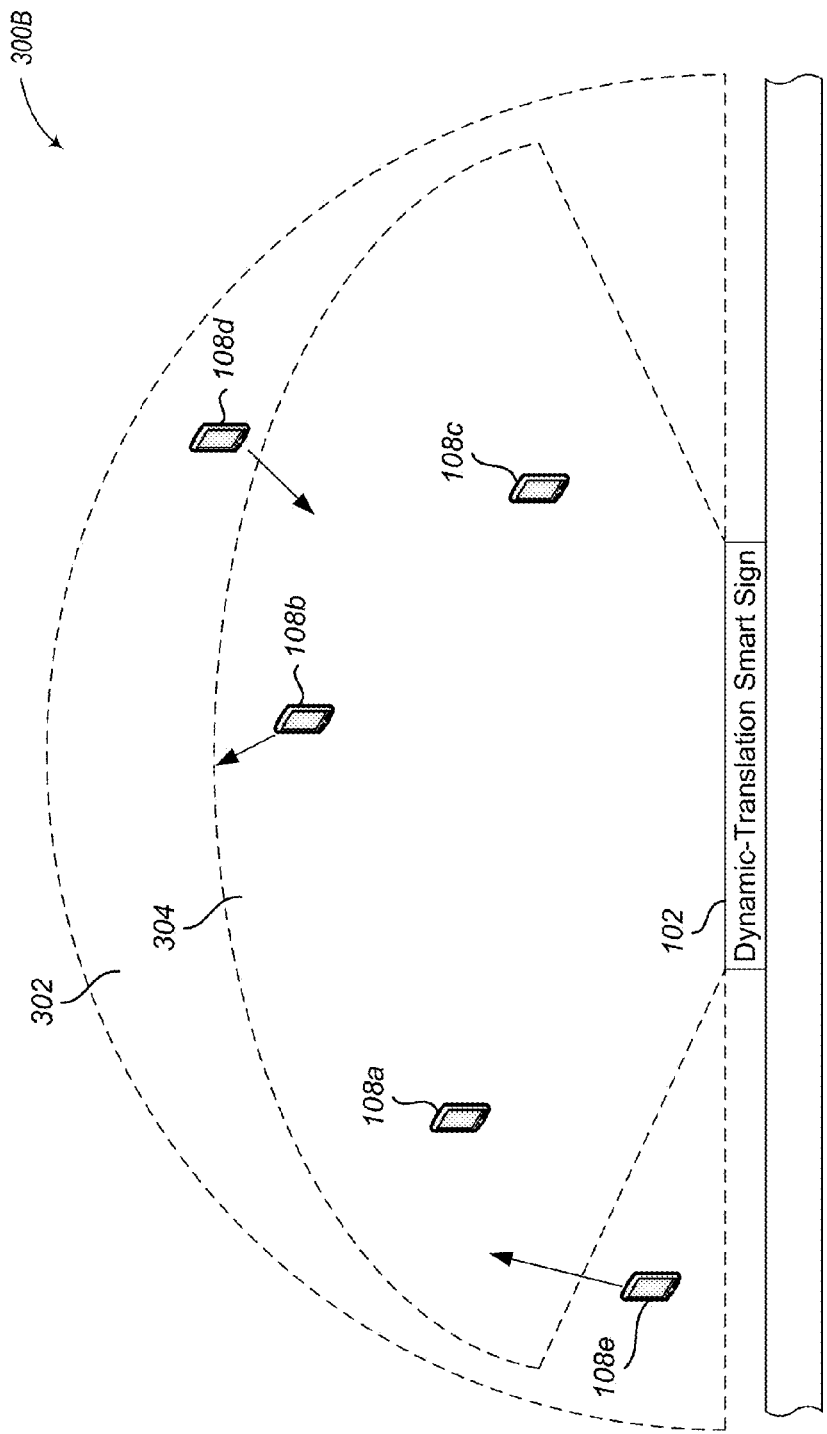
Figure 5:
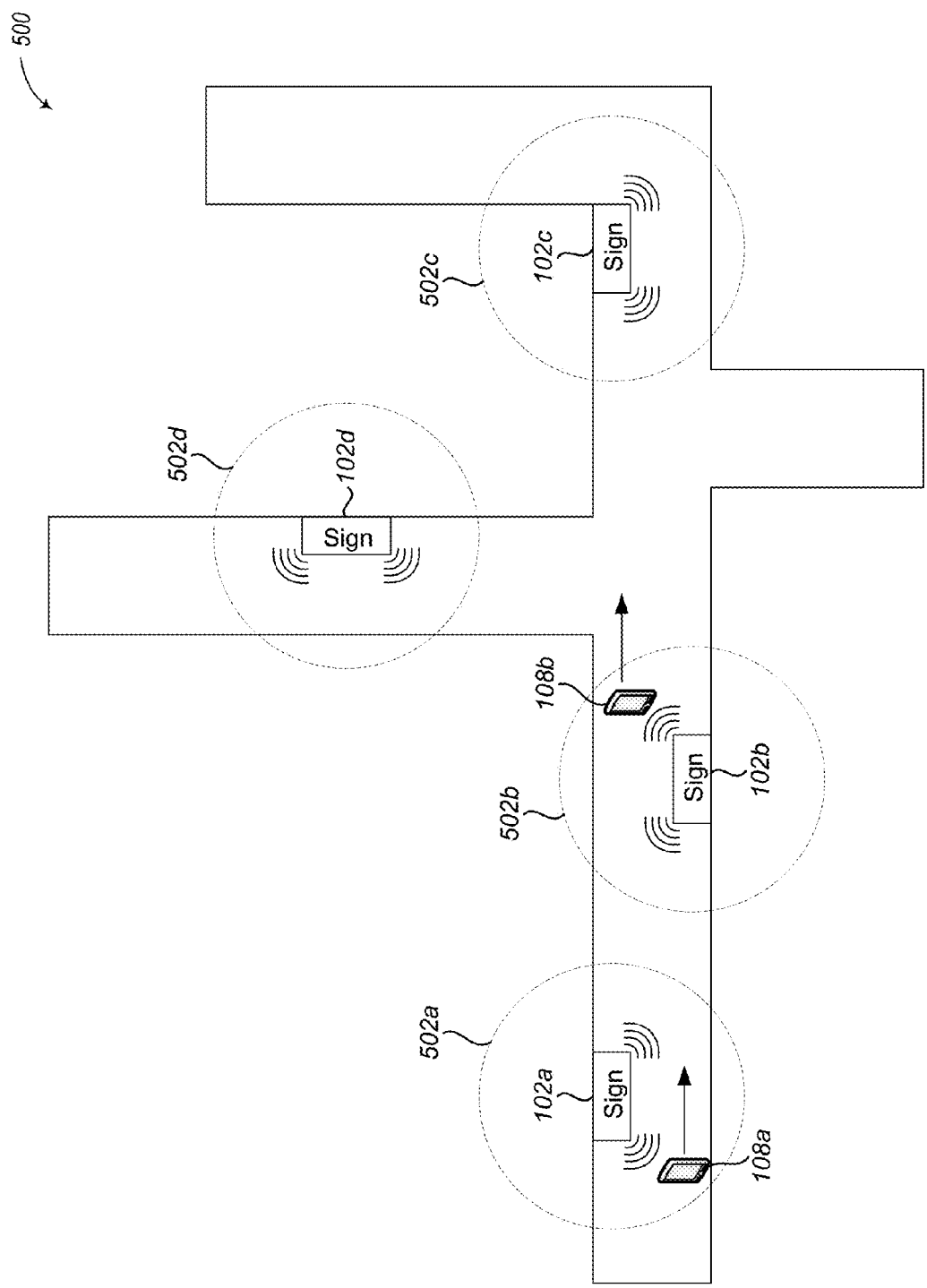
FIG. 5 shows a use case example of a building that is utilizing a plurality of dynamic-translation smart signs in accordance with embodiments described herein.

As mentioned above, the proximity area 302 is the area in which the smart sign 102 can detect, track, or communicate with a mobile device 108. The proximity area 302 may be directional, such as illustrated in FIG. 3A, or it may encompass multiple directions around a smart sign 102, such as 360 degrees as illustrated in FIG. 5. In some embodiments, the proximity area 302 may also include a field-of-view area 304, as illustrated in FIG. 3B FIG. 3B illustrates an example 300B of a dynamic-translation smart sign 102 with a proximity area 302 and a field-of-view area 304. Example 300B is a further illustrative embodiment of example 300A in FIG. 3A.

The field-of-view area 304 is a distance or area in which a user of a mobile device 108 can see, view, hear, interact with, or otherwise digest the content provided by the smart sign 102. In some embodiments, the proximity area 302 and the field-of-view area 304 may be the same area. In other embodiments, the field-of-view area 304 may be a subset of the proximity area 302. The field-of-view area 304 may be pre-determined or set by an administrator based on the purpose of the smart sign 102, what content is being displayed on the smart sign 102, the location of the smart sign 102, or other environmental factors associated with the smart sign 102.

It should be noted that, in some embodiments and situations, the users of the mobile devices 108 may be able to view the content on the smart sign 102 before they enter the field-of-view area 304, but that the field-of-view area 304 is some defined area that when a mobile device 108 enters this area, the smart sign displays the content in the preferred language of that mobile device. For example, a large sign in a mall could be viewed by a lot of people that are very far away from the sign, but the sign will only display the content in other languages for those people that are closer to the sign. In some embodiments, the size of the field-of-view area 304 or the proximity area 302 may be defined by an administrator or limited by the technology utilized to detect or communicate with the mobile devices.

As illustrated, the field-of-view area 304 is smaller than the proximity area 302. This difference in coverage allows the smart sign 102 to detect and track mobile devices 108 before they enter the field-of-view area 304. For example, mobile device devices 108a-108e are within the proximity area 302 of the smart sign 102. Accordingly, the smart sign 102 can obtain the preferred language of each of the mobile devices 108a-108e and track where they are located, and in some embodiments, whether they are moving. For example, the mobile devices 108d and 108e are moving in a direction towards the field-of-view area 304, while mobile device 108b is moving out of the field-of-view area 304.

In some embodiments, the smart sign 102 will display the content in the preferred language of those mobile devices in the proximity area 302 of the smart sign 102. In other embodiments, the smart sign 102 will only display the content in the preferred languages of those mobile devices in the field-of-view area 304, which in this case includes mobile devices 108a-108c.

In various embodiments, the smart sign 102 may track the movement of the mobile devices 108 that are in the proximity area 302 to determine if they are about to leave or enter the field-of-view area 304. Based on this movement information, the smart sign 102 can dynamically adjust the display to include the content in the preferred languages of the mobile devices entering the field-of-view area 304, e.g., mobile devices 108d and 108e, while removing the content in the preferred language of the mobile devices exiting the field-of-view area 304, e.g., mobile device 108b.

The smart sign 102 can also utilize the direction of travel and rate of movement to determine if it will adjust the displayed content. For example, if mobile device 108b is moving very slowly away from the smart sign 102 and out of the field-of-view area 304, then this slow movement rate may indicate that the user of the mobile device 108b is simply backing up rather than walking away from the sign. In contrast, if mobile device 108e is moving very quickly through the field-of-view area 304 and away from the smart sign 102, then this fast movement away from the smart sign 102 may indicate that the user of the mobile device 108e is walking away from the sign rather than moving into the field-of-view area 304 to look at the smart sign 102. In this way, the smart sign 102 may maintain the content in the preferred language of mobile device 108b, but not add the content in the preferred language of mobile device 108e.

Although FIG. 3B illustrates the field-of-view area 304 as partially overlapping the proximity area 302, embodiments are not so limited. In some embodiments, the proximity area 302 and the field-of-view area 304 may be the same area. In other embodiments, the proximity area 302 may be remotely located from the field-of-view area 304 such that they do not overlap at all. For example, the system may include a first proximity detector that is remote from the smart sign 102, which is used to obtain the preferred language of a mobile device 108 and provide the preferred language to the smart sign 102, or to the real-time translation server 124 as described elsewhere herein. The smart sign 102 may include a second proximity detector to determine when the mobile device 108 actually enters the field-of-view area 304, at which point the smart sign 102 displays the translated content.

One example use case of this type of non-overlapping proximity area 302 and field-of-view area 304 may be in an elevator in a hotel or cruise ship. The proximity area 302 may be in the elevator itself and the field-of-view area 304 may be the hallway in front of the smart sign directly outside the elevator. As a user rides the elevator, the system obtains the preferred language of the user and generates translated content based on the preferred language. Once the elevator arrives at the floor with the smart sign, the smart sign displays the translated content. Since the user may only be in front of the sign for a short period of time, any delays in the generating the translated content can result in the user missing the content or forcing the user to pause and wait for the sign to update with the translated content. This type of remote, two-stage tracking can improve the user's experience by reducing visual delays in displaying the translated content. It should be understood that this two-stage tracking can also be performed when the proximity area 302 is larger than the field-of-view area 304, as illustrated in FIG. 3B, or where the proximity area 302 extends beyond the field-of-view area 304.

Figure 3C:
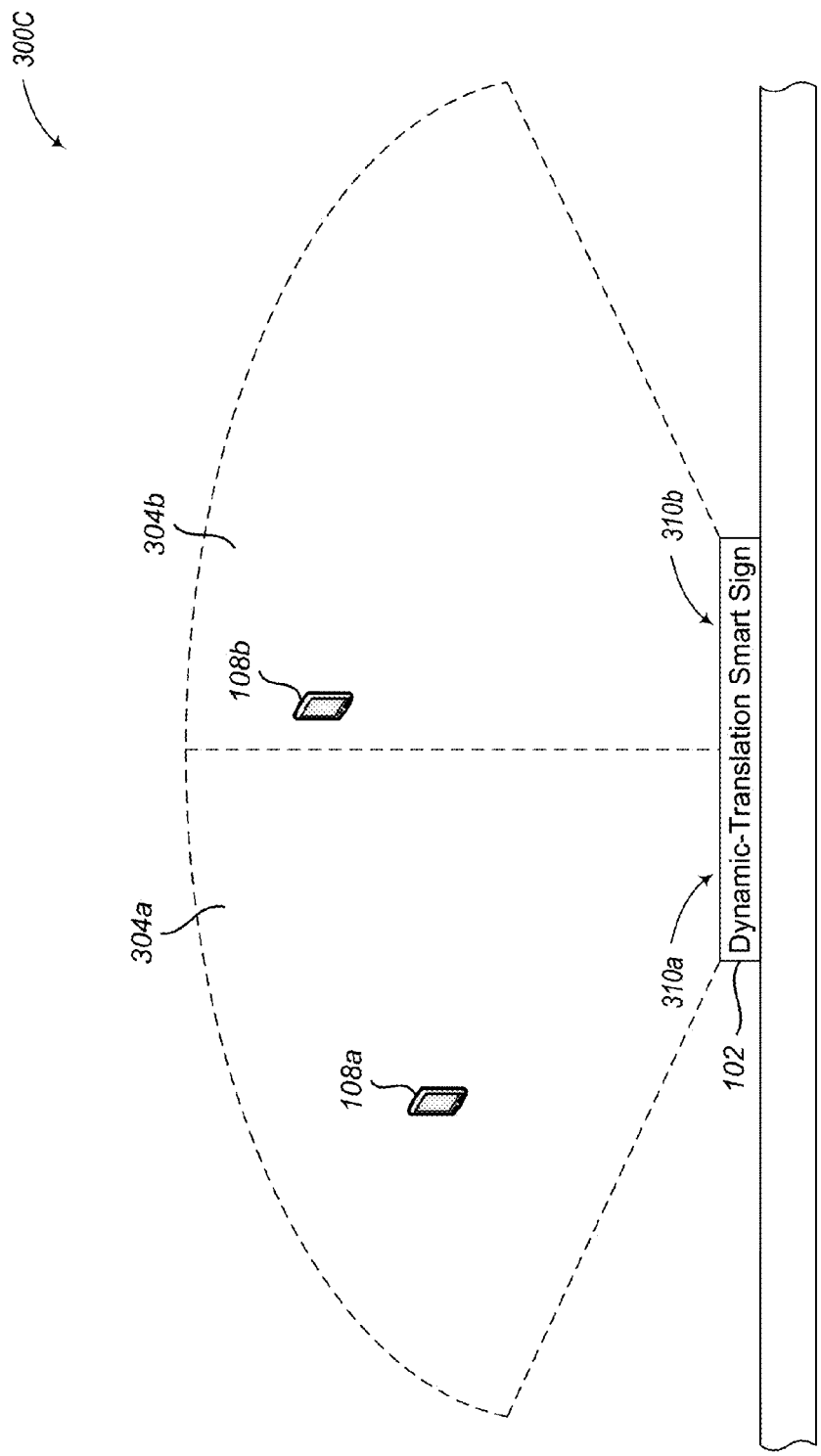

FIG. 3C illustrates an example 300C of a dynamic-translation smart sign 102 with a field-of-view area 304. Example 300C is a further illustrative embodiment of example 300B in FIG. 3B, but the proximity area is not illustrated for ease of discussion. As described above, the proximity area and the field-of-view area may be the same, different, or partially overlapping logical area.

As mentioned above, the field-of-view area 304 may be the area around the smart sign 102 where a user can view the display screen of the smart sign 102. In various embodiments, the field-of-view area 304 may be logically separated into multiple portions or sections. As illustrated, the field-of-view area 304 is separated into lateral field-of-view-area sections 304a and 304b. In this example, the field-of-view-area section 304a is on the right-side of the smart sign 102 and the field-of-view-area section 304b is on the left-side of the smart sign 102, from the perspective of the users viewing the smart sign 102.

In various embodiments, each field-of-view-area section may be associated with a display position on the smart sign 102 so that the rendered content is closer to users in that section. As illustrated, the field-of-view-area section 304a is associated with a right side 310a of the smart sign 102 and the field-of-view-area section 304b is associated with a left side 310b of the smart sign 102, from the perspective of the users viewing the smart sign 102.

Each mobile device in the field-of-view area 304 may be assigned a field-of-view-area section based on their actual locations relative to the smart sign 102. For example, mobile device 108a is located in and assigned to the field-of-view-area section 304a and mobile device 108b is located in and assigned to the field-of-view-area section 304b. If the preferred language of the user of the mobile device 108b is German and the preferred language of the user of the mobile device 108a is French, then the German translated content should be displayed on the left side 310b of the display screen of the smart sign 102 and the French translated content should be displayed on the right side 310a of the display screen of the smart sign 102, both being from the perspective of the users, such as illustrated in FIG. 4C.

Although the above example relies on left- and right-field-of-view-area sections, embodiments are not so limited. For example, if both users are in the field-of-view-area section 304a but it is determined that the user with the preferred language of German is standing to the right of the user with the preferred language of French, from the perspective of the smart sign 102, then, similar to the previous example, the German translated content should be displayed on the left side 310b of the display screen and the French translated content should be displayed on the right side 310a of the display screen, both being from the perspective of the users.

Figure 3D:
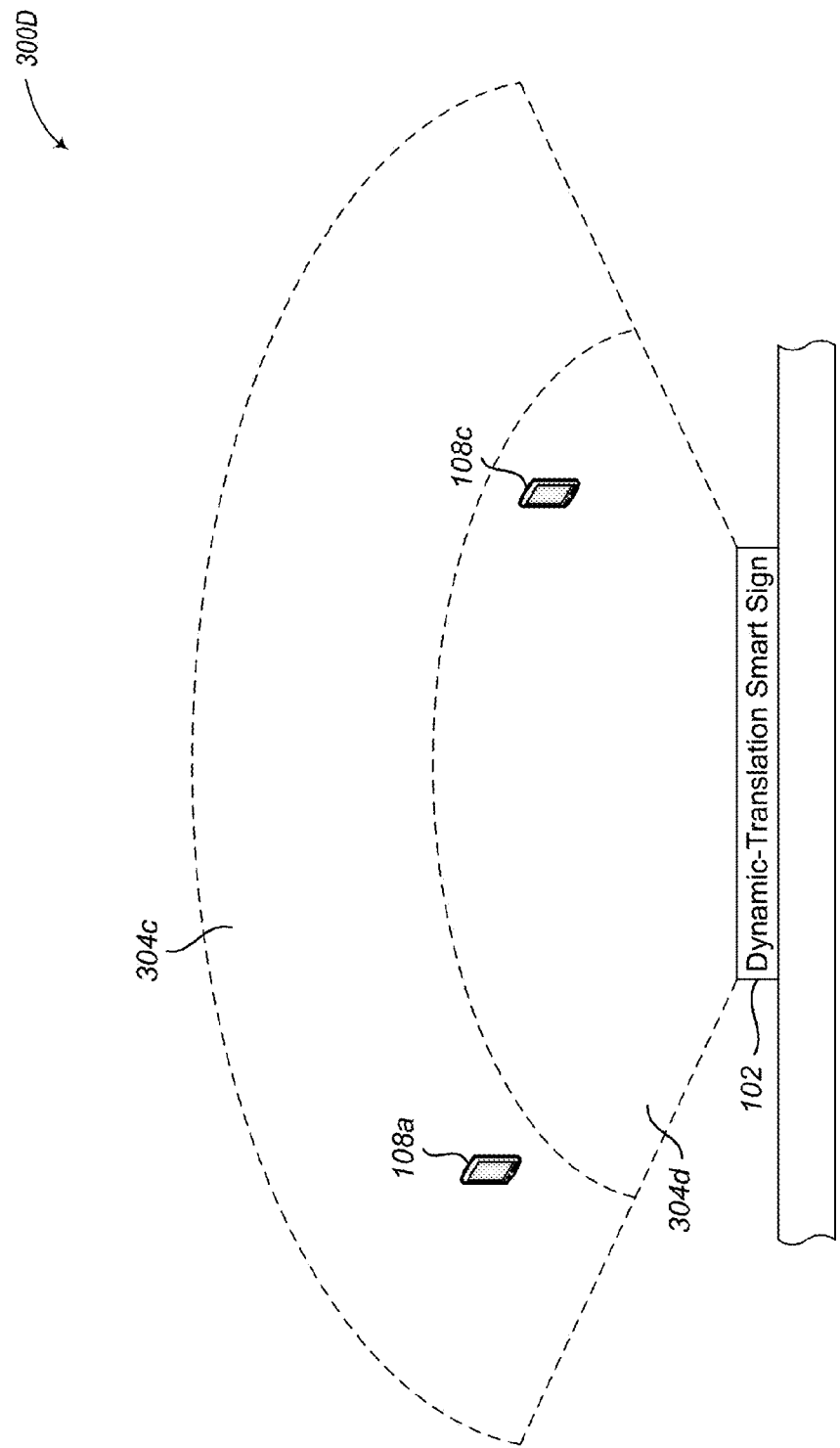

FIG. 3D illustrates an example 300D of a dynamic-translation smart sign 102 with a field-of-view area 304. Example 300D is a further illustrative embodiment of example 300C in FIG. 3C, but the field-of-view area 304 is logically separated into front- and back-medial sections, rather than left- and right-lateral sections. As illustrated, the field-of-view area 304 is separated into field-of-view-area sections 304c and 304d. In this example, the field-of-view-area section 304c is further away from the dynamic-translation smart sign 102 than the field-of-view-area section 304*d*. In various embodiments, the field-of-view-area sections 304*c* and 304*d* may be defined as distance ranges from the smart sign 102 or a threshold distance value may be used as the defining distance that separates the field-of-view-area sections.

Each field-view section 304*c* and 304*d* may be associated with a display characteristic on the smart sign 102 so that the rendered content is more readable to users in the different sections. For example, in some embodiments, the field-of-view-area section 304*c* may be associated with larger content, and the field-of-view-area section 304*d* may be associated with smaller content. In other embodiments, the field-of-view-area section 304*c* may be associated with top portion of the display of the smart sign 102, and the field-of-view-area section 304*d* may be associated with lower portion of the display of the smart sign 102.

Each mobile device in the field-of-view area 304 may be assigned a field-of-view-area section based on their actual locations relative to the smart sign 102 or based on the distance the mobile device is away from the smart sign regardless of their actual location. For example, mobile devices 108*a* is located in and assigned to the field-of-view-area section 304*c* and mobile device 108*c* is located in and assigned to the field-of-view-area section 304*d*. If the preferred language of the user of the mobile devices 108*a* is French and the preferred language of the user of the mobile device 108*c* is Italian, then the French translated content should be displayed larger or at the top of the display screen of the smart sign 102 and the Italian translated content should be displayed smaller or at the bottom of the display screen of the smart sign 102. In this way, the users of the mobile devices 108*a* and 108*c* can more easily view the translated content based on how far away from the smart sign they are.

It should be recognized that embodiments are not limited to logically separating the field-of-view area 304 into only one or two sections. Rather other numbers and arrangements of logical-field-of-view-area sections may be utilized. For example, the smart sign may utilize two or more lateral sections, two or more medial sections, or a combination thereof.

Figure 3E:
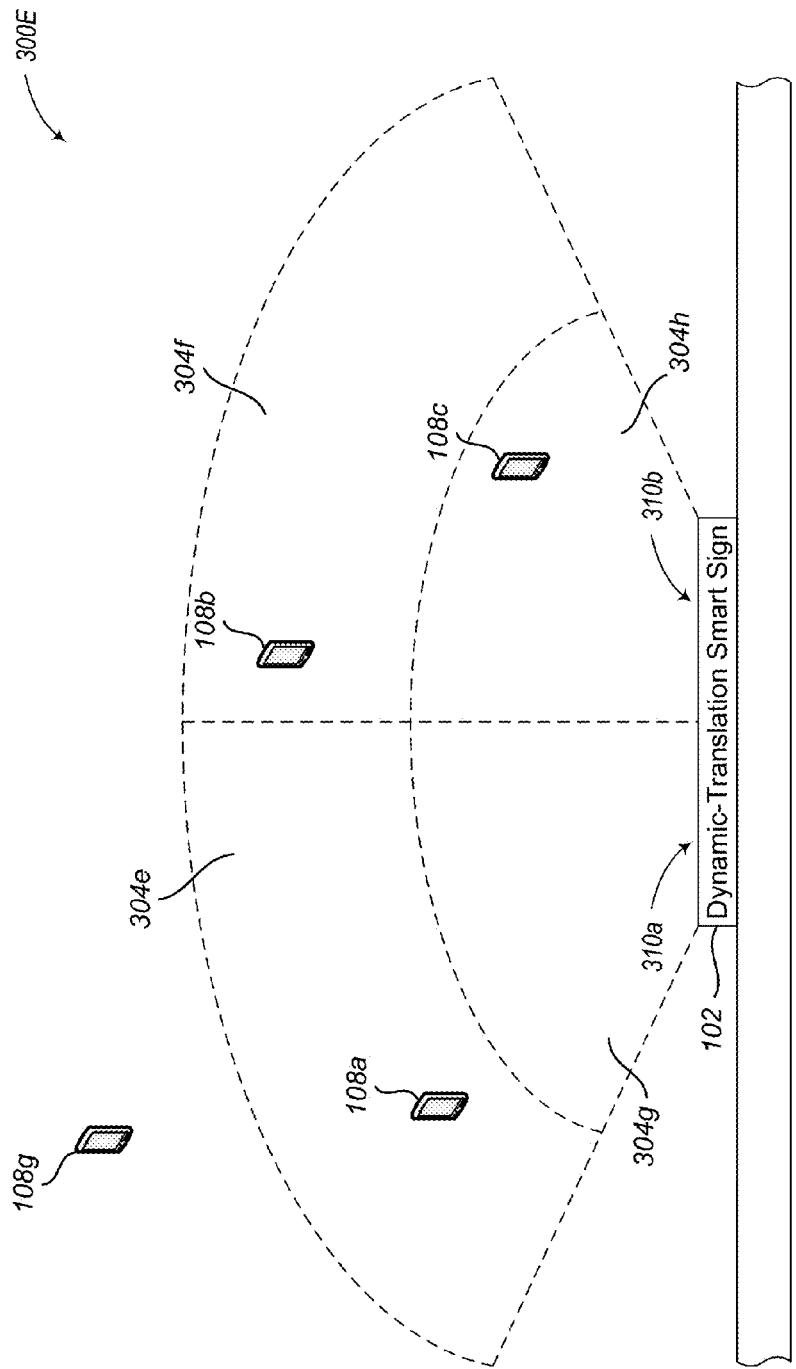

For example, FIG. 3E illustrates an example 300E of a dynamic-translation smart sign 102 with a field-of-view area 304 that is logically separated into four, quadrant-like field-of-view-area sections 304*e*-304*h*. Similar to what is described above in conjunction with FIGS. 3C and 3D, the field-of-view-area sections may be utilized to position the translated content on the smart sign, as well as to modify the display size of the translated content based on which field-of-view-area section a mobile device is located.

In this illustration, the mobile device 108*a* is located in and assigned to the field-of-view-area section 304*e*, the mobile device 108*b* is located in and assigned to the field-of-view-area section 304*f*, and the mobile device 108*c* is located in and assigned to the field-of-view-area section 304*h*. If the preferred language of the user of the mobile device 108*b* is German, the preferred language of the user of the mobile device 108*a* is French, and the preferred language of the user of the mobile device 108*c* is Italian, then the German translated content and the Italian translated content should be displayed on the left side 310*b* of the display screen of the smart sign 102 with the German translated content being larger than or on displayed above the Italian translated content, and the French translated content should be displayed on the right side 310*a* of the display screen of the smart sign 102 in a larger size, all positioning being from the perspective of the users.

In various embodiments, the dynamic-translation smart sign 102 may continuously utilize a specific pattern or arrangement of field-of-view-area sections, such as illustrated in FIGS. 3B-3F. In some embodiments, the field-of-view-area sections may change based on the number of mobile devices that enter the sections over time. For example, if no mobile devices enter a particular section over a one week period, then there may be an obstacle or obstruction preventing mobile devices from entering that area. In response, the dynamic-translation smart sign may adjust the field-of-view-area sections to remove that section or merge it with one or more other sections. The modifications to the various sections may be made in an attempt to balance the number of mobile devices for each section over a given period of time, which can provide a more uniform and attractive display when multiple languages are being displayed.

In yet other embodiments, the dynamic-translation smart sign 102 may utilize one or more field-of-view-area sections based on the number of mobile devices that are in the proximity area or the field-of-view area. For example, if there is only one mobile device in the field-of-view area, then only a single section may be utilized, such as illustrated in FIG. 3B. But if another mobile device enters the field-of-view area, then a second section may be added, such as illustrated in FIG. 3C or 3D. Similarly, if a third mobile device, or more, enters the field-of-view area, then the smart sign may utilize a more grid-like pattern, similar to what is illustrated in FIG. 3E. In yet other embodiments, the number and arrangement of field-of-view-area sections may be determined or modified based on the number or location of mobile devices that are in the proximity area, which may take into account all mobile devices in the proximity area or only those mobile devices in the proximity area but are net yet in the field-of-view area. As a result, the number and arrangement of field-of-view-area sections may dynamically change based on the number of mobile devices in the field-of-view area or in the proximity area.

Figure 4A:
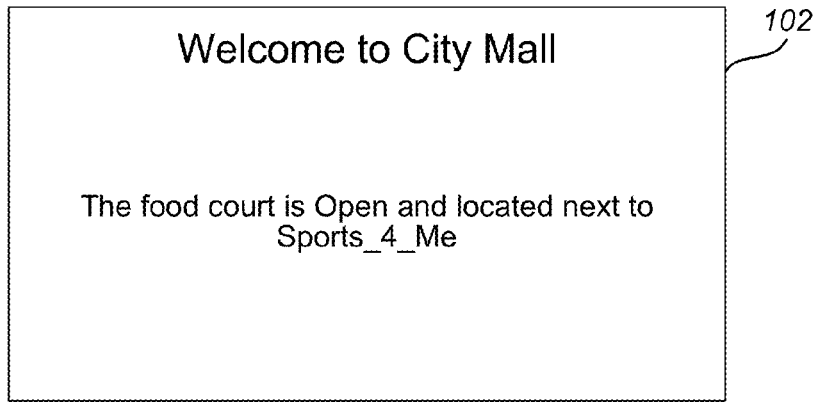
FIGS. 4A-4F show use case examples of the content displayed by a dynamic-translation smart sign in accordance with embodiments described herein.
Figure 4B:
Figure 4C:

FIGS. 4A-4F show use case examples of the content displayed by a dynamic-translation smart sign in accordance with embodiments described herein. FIG. 4A illustrates a dynamic-translation smart sign 102 that is displaying content in a default language. In this particular example, the dynamic-translation smart sign 102 is providing information in English that the food court is open and that it is located next to the store "Sports_4_Me."

When a mobile device enters the proximity of the dynamic-translation smart sign 102, e.g., proximity area 302 or field-of-view area 304, the dynamic-translation smart sign 102 obtains the preferred language of the mobile device. Assume the obtained preferred language of the mobile device is German. The dynamic-translation smart sign 102 translates the content into German and customizes the display to include the German translated content on the dynamic-translation smart sign 102, which is illustrated in FIG. 4B. In some embodiments, the content may also be displayed in the default language along with the translated content. In some embodiments, the default language version of the content may be resized and repositioned to be smaller and below the translated content. In this way, the translated content is emphasized while maintaining the default language on the dynamic-translation smart sign 102. As shown in FIG. 4B, the German translated content is displayed more prominently than the default English version.

In some embodiments, the dynamic-translation smart sign 102 determines a distance between the mobile device and the dynamic-translation smart sign 102. This distance is utilized by the dynamic-translation smart sign 102 to determine how large the content should be. For example, the further the mobile device is away from the dynamic-translation smart sign 102, the larger the display size of the content, and the closer the mobile device is to the dynamic-translation smart sign 102, the smaller the display size of the content. In some embodiments, as the mobile device approaches the smart sign, the display size of the content may be dynamically changed, e.g., made smaller, to accommodate for the user being closer to the smart sign. In at least one of various embodiments, multiple fields of view or one or more threshold values may be utilized and compared with the distance between the mobile device and the dynamic-translation smart sign 102 to determine the size of the content, such as described above in conjunction with FIG. 3D.

Next assume a second mobile device with a preferred language of French enters the proximity of the dynamic-translation smart sign 102 with the first mobile device still in the proximity of the dynamic-translation smart sign 102. The dynamic-translation smart sign 102 translates the content into French and further customizes the display to include the French translated content along with the German translated content on the dynamic-translation smart sign 102, which is illustrated in FIG. 4C. In various embodiments, the size and display position of the translated content may be modified to accommodate the additional translations.

In some embodiments, the dynamic-translation smart sign 102 determines a location of each of the mobile devices relative to the dynamic-translation smart sign 102, such as described elsewhere here. The dynamic-translation smart sign 102 can display the translated content so that each one is closer or more visible to the mobile device with the corresponding preferred language. For example, assume the mobile device with the preferred language of German is to the left of the mobile device with the preferred language of French, from the perspective of the users of the mobile devices relative to the dynamic-translation smart sign 102. In this case, the German translated content may be displayed on a left of the dynamic-translation smart sign 102 and the French translated content may be displayed on the right of the dynamic-translation smart sign 102, from the perspective of the users, as shown in FIG. 4C.

Similar to what is described elsewhere herein, the dynamic-translation smart sign 102 can determine a distance between each mobile device and the dynamic-translation smart sign 102. These distances can be utilized by the dynamic-translation smart sign 102 to determine the display size of each translated content. For example, the translated content for the mobile device that is closer to the dynamic-translation smart sign 102 may be larger than the translated content for the mobile device that is further from the dynamic-translation smart sign 102.

As described herein multiple fields of view or one or more threshold values may be utilized and compared with the distance between each mobile device and the dynamic-translation smart sign 102 or the location of each mobile device relative to the dynamic-translation smart sign 102 to determine the size or location of each translated content.

Figure 4D:
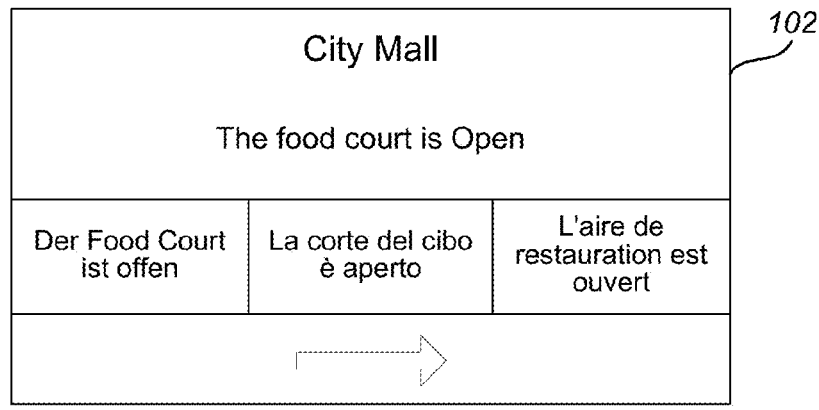

Next assume a third mobile device with a preferred language of Italian enters the proximity of the dynamic-translation smart sign 102 with the first and second mobile devices still in the proximity of the dynamic-translation smart sign 102. The dynamic-translation smart sign 102 translates the content into Italian and displays it, along with the German translated content and the French translated content, on the dynamic-translation smart sign 102. In various embodiments, the location of the mobile devices may be utilized to determine the graphical position to display each translated content on the dynamic-translation smart sign 102. As described herein, a partial or shorter version of the content may also be selected due to constraints on the amount of graphical space on the dynamic-translation smart sign 102. In some embodiments, non-text content may also be included to accommodate the text that is removed from the translated content. As illustrated in FIG. 4D, each translated content is shortened to state that the food court is open and an arrow has been added to illustrate which way to go to the food court, rather than include in each translation the location of the food court.

Figure 4E:
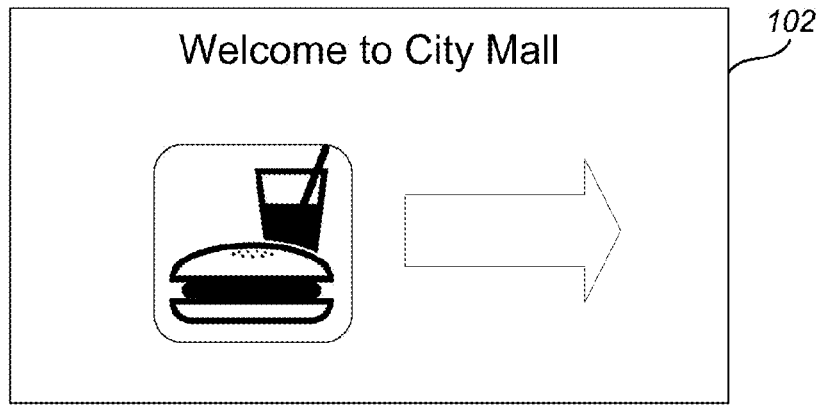
Figure 4F:
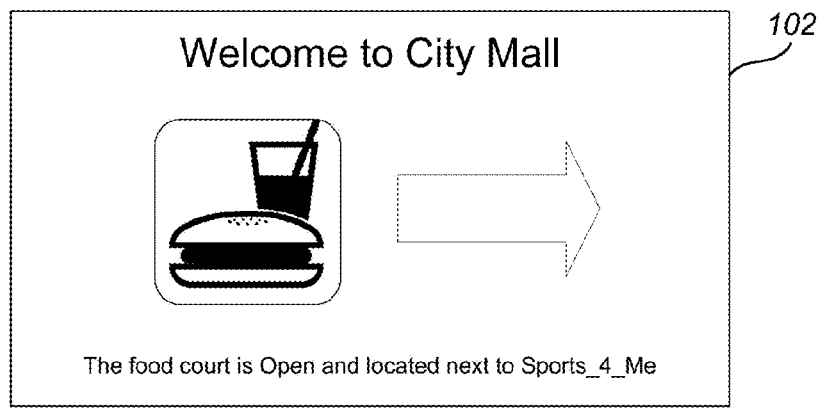

In some embodiments, the number of preferred languages may be too great to adequately display on the dynamic-translation smart sign 102. Accordingly, the content may be replaced with a non-text version of the content. As illustrated in FIG. 4E, an image of food and an arrow in the direction of the food is displayed rather than each separate translation. As described elsewhere herein, the dynamic-translation smart sign 102 may also display the content in the default language along with the non-text version, as shown in FIG. 4F.

It should be understood that these examples are for illustrative purposes and are not to be construed as exhaustive or limiting.

FIG. 5 shows a use case example of a building that is utilizing a plurality of dynamic-translation smart signs in accordance with embodiments described herein. Example 500 shows a top-down view of a building, such as a mall, that is utilizing a plurality of dynamic-translation smart signs 102 to provide information to people walking through the mall. Each dynamic-translation smart sign 102 includes a proximity 502. The proximity 502 of the dynamic-translation smart signs 102 may overlap or they may be separated by some distance, as illustrated.

In this illustration, a mobile device 108a has entered the proximity 502a of the dynamic-translation smart sign 102a. Utilizing embodiments described herein, the dynamic-translation smart sign 102a determines the preferred language of the mobile device 108a and translates its displayed content into the preferred language. Similarly, a mobile device 108b has entered the proximity 502b of the dynamic-translation smart sign 102b. Utilizing embodiments described herein, the dynamic-translation smart sign 102b determines the preferred language of the mobile device 108b and translates its displayed content into the preferred language.

In some embodiments, the dynamic-translation smart sign 102a may determine that the mobile device 108a is moving towards dynamic-translation smart sign 102b. In at least one such embodiment, the dynamic-translation smart sign 102a may provide the preferred language of mobile device 108a to the dynamic-translation smart sign 102b prior to the mobile device 108a entering the proximity 502b of the dynamic-translation smart sign 102b. The dynamic-translation smart sign 102b may display its contents in the preferred language of mobile device 108a when mobile device 108b exits its proximity 502b or when mobile device 108a enters its proximity 502b.

Similarly, in some embodiments, the dynamic-translation smart sign 102b may determine that the mobile device 108b is moving towards dynamic-translation smart sign 102c or dynamic-translation smart sign 102d. Since the dynamic-translation smart sign 102b does not know exactly which sign the mobile device 108b will encounter due to the layout of the mall, it may forward the preferred language of mobile device 108*b* to both dynamic-translation smart signs 102*c* and 102*d*. Dynamic-translation smart signs 102*c* and 102*d* may both display their contents in the preferred language of mobile device 108*b* even before the mobile device 108*b* enters their respective proximities 502*c* and 502*d*, assuming that there are no other mobile devices in proximity to those signs. Dynamic-translation smart signs 102*c* and 102*d* may end translating their content into the preferred language of mobile device 108*b* if mobile device 108*b* does not enter their respective proximities within a predetermined amount of time. As such, each dynamic-translation smart sign 102 may include a timeout function that returns the display of content to the default language if a mobile device does not enter its proximity within a predetermined amount of time, or if a dynamic-translation smart sign 102 does not detect a previous mobile device in its proximity within a predetermined amount of time.

The above example should not be construed as exhaustive or limiting and other numbers of dynamic-translation smart signs 102 may be employed in a variety of different environments and settings.

The operation of certain aspects of the disclosure will now be described with respect to FIGS. 6-10. In at least one of various embodiments, processes 600, 700, 800, 900, and 1000 described in conjunction with FIGS. 6-10, respectively, may be implemented by or executed on one or more computing devices, such as dynamic-translation smart sign 102 or real-time translation server 124.

Figure 6:
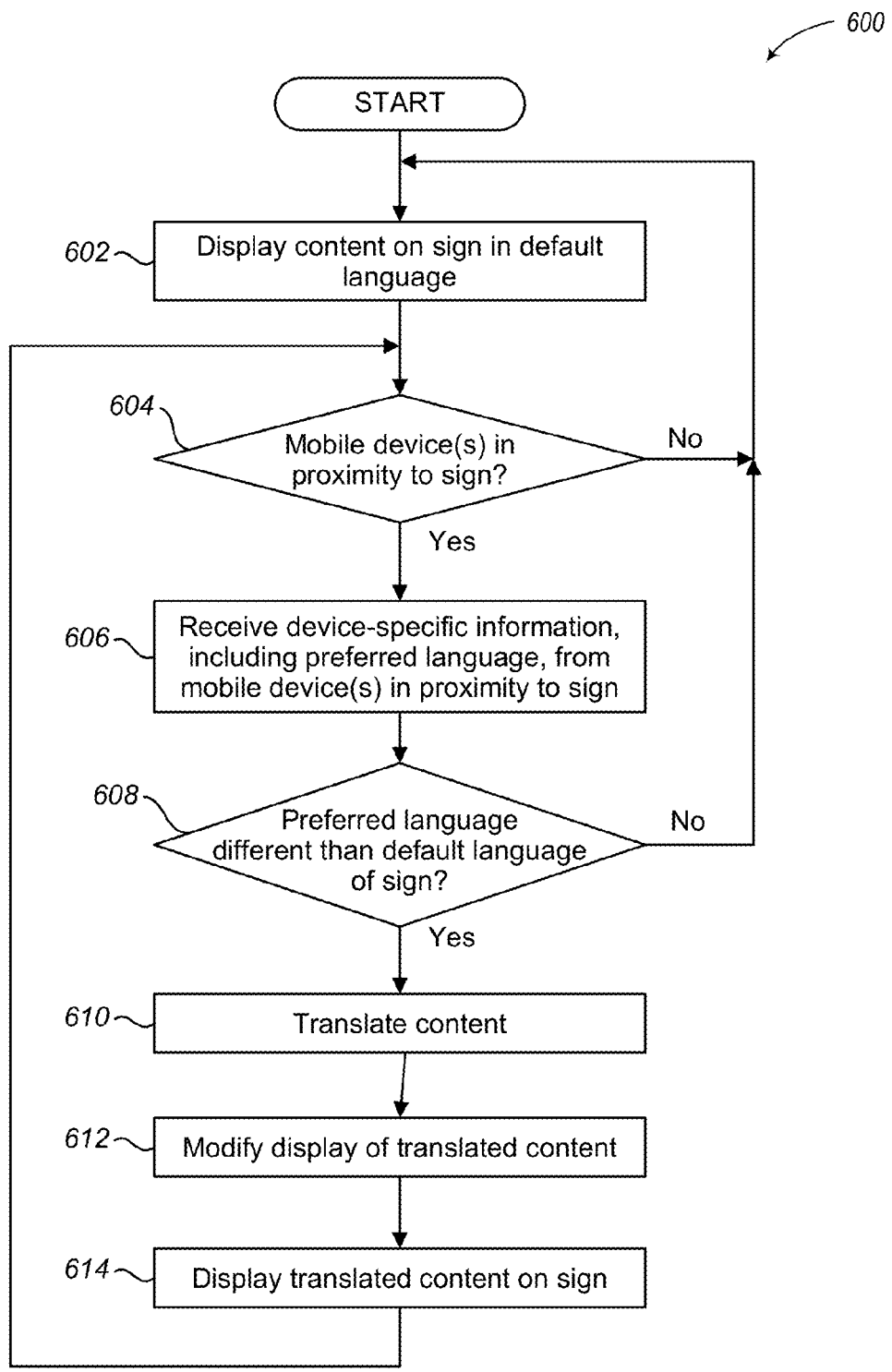
FIG. 6 illustrates a logical flow diagram generally showing one embodiment of an overview process for dynamically providing real-time translations of content on a smart sign based on the preferred language of the mobile devices in close proximity to the smart sign in accordance with embodiments described herein.

FIG. 6 illustrates a logical flow diagram generally showing one embodiment of an overview process for dynamically providing real-time translations of content on a smart sign based on the preferred language of the mobile devices in close proximity to a smart sign in accordance with embodiments described herein. In some embodiments, process 600 is implemented by dynamic-translation smart sign 102, which may or may not have access to a real-time translation server 124. In other embodiments, process 600 is implemented by the real-time translation server 124, which receives the preferred languages from the dynamic-translation smart sign 102 and provides the content to be displayed to the dynamic-translation smart sign 102. In yet other embodiments, some portions of process 600 are performed by the dynamic-translation smart sign 102 and other portions of process 600 are performed by the real-time translation server 124.

Process 600 begins, after a start block, at block 602, where content is displayed on a smart sign, such as dynamic-translation smart sign 102, in a default language for the smart sign. In some embodiments, the content is stored on the smart sign. In other embodiments, the content is provided to the smart sign in real time by a server, such as real-time translation server 124

In various embodiments, the default language may be preprogrammed into the smart sign, or it may be provided or changed by a server, such as real-time translation server 124. In some embodiments, the default language may change over time based on the preferred language of mobile devices in proximity to the smart sign. For example, if the smart sign consistently detects mobile devices associated with one language, then the smart sign may modify its default language to that language. In some embodiments, this modification may occur in response to the smart sign detecting a number of mobile devices with a same preferred language above a threshold value within a predetermined time period.

Process 600 proceeds to decision block 604, where a determination is made whether there are any mobile devices in proximity to the smart sign. In various embodiments, the smart sign is configured to detect the presence of one or more mobile devices that are in proximity to the dynamic-translation smart sign 102, such as by using a beacon or other proximity detector.

A mobile device is in proximity to the smart sign when the mobile device is within a predetermined proximity distance from the smart sign, within communication range of the smart sign via a short-range communication technology, in a predetermined location relative to the smart sign, or a combination thereof. In various embodiments, the proximity of the smart sign is pre-determined or set by an administrator based on the purpose of the smart sign, what content is being displayed on the smart sign, the location of the smart sign, or other the environmental factors associated with smart sign. In some embodiments, a mobile device is in proximity to the smart sign when the mobile device is within a proximity area of the smart sign, such as the proximity area 302, as described elsewhere herein. In other embodiments, a mobile device is in proximity to the smart sign when the mobile device is in the visual field of display of the smart sign 102, such as the field-of-view area 304, as described elsewhere herein.

If there is one or more mobile devices in the proximity of the smart sign, then process 600 flows to block 606; otherwise, process 600 loops to block 602 to display the content in the default language. Since users can move around and come and go from the proximity of the smart sign, the smart sign is periodically, continuously, or at predetermined times checking to determine if mobile devices have left the proximity of the smart sign or if new mobile devices have come in the proximity of the smart sign. Accordingly, the smart sign is dynamically determining which mobile devices are in proximity to the smart sign, and if there are no mobile devices in the proximity of the smart sign, the smart sign returns to displaying the content in a default language at block 602.

At block 606, device-specific information is received from the mobile device(s) that are in the proximity of the smart sign. In various embodiments, the device-specific information from a mobile device includes one or more settings or information associated with that mobile device. Mobile devices can have a variety of different privacy settings that define what information the mobile device can provide to other devices, with or without the user's knowledge. In some embodiments, the device-specific information of the mobile device may be provided to the smart sign by the mobile device without the user's knowledge. In other embodiments, the user may have to opt in to have its mobile device provide its device-specific information to the smart sign.

In various embodiments, the device-specific information from a mobile device includes a preferred language for that mobile device. Accordingly, a preferred language for each mobile device that is in proximity to the smart sign is determined. The preferred language of a mobile device is presumed to be the preferred speaking and reading language of the user of that mobile device, and is the language that the user would want to use when reading content displayed on the smart sign.

In various embodiments, the smart sign may receive the preferred language from a mobile device when the mobile device comes within communication range of the smart sign. In some embodiments, the mobile device may be periodically broadcasting information that can be received by other devices. The mobile device may be broadcasting the preferred language itself, or other device-specific information, or it may be broadcasting its identifier such that the smart sign can respond to the mobile device and request the preferred language or other device-specific information (e.g., age of the user or other general settings of the mobile device).

In other embodiments, the mobile device may not be broadcasting any information, but the smart sign may be periodically transmitting requests for mobile devices that are within communication range of the smart sign to respond to the smart sign with its preferred language or other device-specific information. In at least one such embodiment, the smart sign and the mobile device may establish a communication link between the devices, such that the smart sign can request the preferred language from the mobile device and the mobile device can respond to the smart sign with the preferred language of the mobile device.

In various embodiments, a plurality of mobile devices may be determined, at decision block 604, to be in proximity to the smart sign at any given point in time. The smart sign obtains or otherwise receives the preferred language of each separate mobile device that is in proximity to the smart sign. Accordingly, a plurality of preferred languages (which may be the same or different from one another) are received from the plurality of mobile devices.

In some embodiments, where the real-time translation server 124 is performing the translations, instructing the dynamic-translation smart sign 102 which content to display in the appropriate language, or modifying the display of the content, then the smart sign can provide the preferred language(s) of the mobile device(s) that is in proximity to the smart sign to the real-time translation server 124 for further processing.

Process 600 proceeds to decision block 608, to determine whether any of the determined preferred languages are different from the default language of the smart sign. In various embodiments, the preferred language of each mobile device that is in proximity to the smart sign is compared to default language. If at least one preferred language is different from the default language of the smart sign, then process 600 flows to block 610; otherwise, process 600 loops to block 602 to continue to display the content on the smart sign in the default language.

At block 610, the content is translated into each preferred language of the mobile devices in proximity to the smart sign. In some embodiments, if the number of preferred languages is above a predetermined threshold, then the content itself may be modified before or after translation to use fewer words, which can allow for more languages to be simultaneously displayed on the smart sign. In other embodiments, if the number of preferred languages is above a second predetermined threshold, then the content may be translated into a non-text or non-word version of the content. For example, if the smart sign is displaying text that describes the location of a restaurant in a mall and there are too many preferred languages near the smart sign, then the smart sign may select a non-text version of the content to display, such as a picture of food with an arrow in the direction of the restaurant.

In some other embodiments, the preferred language may indicate that the user of the mobile device is visual impaired. In at least one such embodiment, the translation may include converting the visual content into an audio version. In some embodiments, the translation may be a machine reading of the content or it may be a pre-stored audio file associated with the content. In this way, as a visually impaired user enters the proximity of the smart sign, the smart sign plays the audio file so that the user knows what is being conveyed by the smart sign without relying on Braille or another person to read the smart sign.

In various embodiments, dynamic-translation smart sign 102 or the real-time translation server 124 may store separate full or partial translated versions of a plurality of content as described elsewhere herein. In other embodiments, the dynamic-translation smart sign 102 or the real-time translation server 124 may perform real-time translations of the content using machine- or computer-aided translation technologies.

Process 600 continues at block 612, where a display of the translated content is modified, which is discussed in more detail below in conjunction with FIG. 7. Briefly, however, the display of the translated content is customized based on the preferred languages in proximity to the sign. Such customization includes determining or modifying the size, color, display position, movement on the display screen, amount of text to display, or other characteristics of the translated content so that the translated content is emphasized or made easier for a user to view. In one simple, non-limiting, non-exhaustive example, the position on the display screen at which to render each translated version of the content may be modified so that each translated version can be displayed on the display screen. In some embodiments, the display position may be determined based on a location of the associated mobile devices relative to the smart sign. In some embodiments, the content may still be displayed in the default language, but in a size or position that does not detract from the translated content, such as, for example, displayed as a reduced in size or at a bottom portion of the display screen.

Process 600 proceeds next to block 614, where the translated content is displayed on the smart sign. In some embodiments, the real-time translation server 124 provides the translated content to the smart sign for display. In other embodiments, the real-time translation server 124 provides instructions to the smart sign on how the smart sign is to render the translated content based on the modified display. The smart sign can combine the translated content based on the received instructions and render the combined content on the display screen of the smart sign. In yet other embodiments, the real-time translation server 124 combines the translated content based on the modified display and provides an output data stream that is rendered by the smart sign.

In some embodiments, the translated content is simultaneously displayed in multiple languages on the smart sign. In other embodiments, the smart sign may separately display the translated content in each language for a predetermined amount of time before displaying the content in another language. The amount of time to display the content may be dependent on the number of mobile devices having a same preferred language such that the higher the number of mobile devices that have a same preferred language, the longer the translated content in that language will be displayed.

As described herein, the system can utilize one or more proximity detectors, sensors, technologies, or mechanisms to determine what languages to show, how content is to be modified for display, and how to display the translated or modified content. So in some embodiments, the proximity area and the field-of-view area may be a same area, where the translated content is displayed when the user is in the proximity of the smart sign. In other embodiments, the smart sign may utilize a proximity area to detect a mobile device at decision block 604 and determine its preferred language at block 606 prior to the user being in the field-of-view area of the smart sign, e.g., as described above in conjunction with FIGS. 3A-3B. Once the mobile device is detected to be within the field-of-view area, the content is displayed in the preferred language of that mobile device, e.g., as described above in conjunction FIGS. 3B-3E. In various embodiments, the content may be translated at block 610 or the display of the translated content may be modified at block 612 before or after the mobile device is in the field-of-view area. In yet other embodiments, the smart sign may display the content in the preferred language of the mobile device prior to the mobile device being in field-of-view area in anticipation of the mobile device entering the field-of-view area, such as if the mobile device is moving in a path that will result in the mobile device being within the visual field of display of the smart sign.

After block 614, process 600 loops to decision block 604 to determine if there are other mobile devices in proximity to the smart sign. As described elsewhere herein, the mobile devices that are in proximity to the smart sign can change overtime. Accordingly, the smart sign periodically, continuously, or at predetermined times checks to determine if mobile devices have left the proximity of the smart sign or if new mobile devices have come in the proximity of the smart sign, and dynamically translates the content into the preferred languages of those mobile devices in proximity and displays them on the smart signs.

In some embodiments, the translated content may be displayed for a predetermined period of time before the content is redisplayed in the default language. In other embodiments, the translated content may continue to be displayed until another preferred language is detected.

Figure 7:
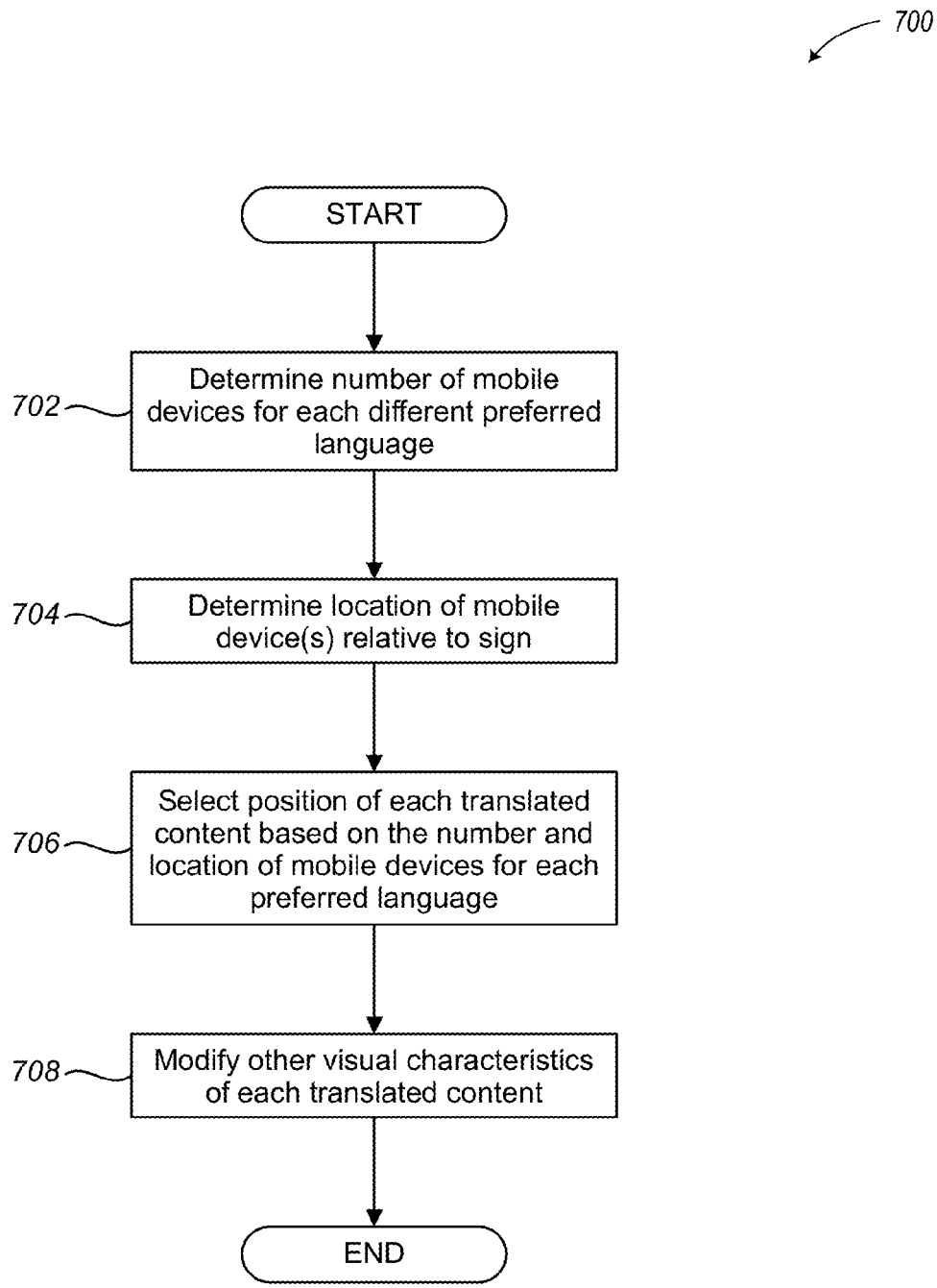
FIG. 7 illustrates a logical flow diagram generally showing one embodiment of a process for modifying the visual characteristics of translated content based on the mobile devices that are in proximity to a dynamic-translation smart sign in accordance with embodiments described herein.

FIG. 7 illustrates a logical flow diagram generally showing one embodiment of a process for modifying the visual characteristics of translated content based on the mobile devices that are in proximity to a smart sign in accordance with embodiments described herein. Process 700 begins, after a start block, at block 702, where the number of mobile devices is determined for each different preferred language of those mobile devices that are in proximity to the smart sign. Again, devices may be in proximity to the smart sign if the mobile device is in a proximity area of the smart sign, e.g., proximity area 302, or a field-of-view area of the smart sign, e.g., field-of-view area 304.

Process 700 proceeds to block 704, where a location of the mobile device(s) in proximity to the smart sign is determined relative to the smart sign. In various embodiments, the smart sign may utilize a variety of range and directional sensors, technologies, or mechanisms known to those skilled in the art to determine the location of each mobile device relative to the smart sign. In some embodiments, the smart sign may determine the location of each mobile device over a period of time to determine if and in what direction and rate the mobile device is moving relative to the smart sign.

Process 700 continues at block 706, where a graphical display position is determined for each translated content based on the location of the mobile devices and the number of mobile devices for each preferred language. In various embodiments, the display of the translated content is modified so that the content for each corresponding user, or users that have a same preferred language, is closer to or in a display position that is logically easier for the corresponding user(s) to view relative to other users.

As mentioned above, the viewable area in front of the smart sign, or field-of-view area, may be logically separated into multiple different sections. Each logical section may be associated with a display position on the smart sign or content size so that the rendered content is closer to users in that section or more easily viewed based on the users' location. For example, assume the field-of-view area in front of the smart sign is logically separated into a left-viewing section and a right-viewing section from the perspective of the users viewing the smart sign, such as field-of-view-area sections 304*b* and 304*a* of FIG. 3C, respectively. If the preferred language of a user in the left-viewing section is German and the preferred language of the user in the right-viewing section is French, then the German translated content should be displayed on the left side of the display screen of the smart sign and the French translated content should be displayed on the right side of the display screen of the smart sign, both being from the perspective of the users, such as illustrated in FIG. 4C.

Now assume the default language of the content is English and it was originally displayed in the middle of the smart sign in big bold letters. The English version of the content may be positioned at a bottom of the screen in smaller text, with the German translated content and the French translated content being larger than the English version and on the left and right side of the display screen, respectively, as described above.

Although the above example relies on left- and right-viewing sections, embodiments are not so limited, as further described an illustrated and described above in conjunction with FIGS. 3A-3E

In some embodiments, the smart sign may determine that a mobile device of a user is moving based on a change in location over time. In at least one such embodiment, the corresponding content for that user may be positioned on the display to track and follow the movement of the mobile device as the user walks in front of the smart sign. In various embodiments, this type of tracking may be utilized when there are only one or two mobile devices in proximity to the smart sign. After some threshold number of mobile devices is in proximity to the smart sign, then such tracking may be stopped. In other embodiments, the smart sign can control a motor on a bracket that supports the smart sign such that a primary viewing angle of the smart sign tracks the user as the user walks past the smart sign.

In various embodiments, the display position of the content may be based on the number of mobile devices for each determined preferred language. In at least one such embodiment, the ratio or percentage of each preferred language may be determined relative to the other preferred languages. For example, assume there are 10 mobile devices in proximity to the smart sign, 3 devices have a preferred language of English, 6 devices have a preferred language of German, and 1 device has a preferred language of French. Accordingly, 60% of the mobile devices in proximity to the smart sign prefer German, 30% prefer English, and 10% prefer French. The content can then be displayed with the German translated content being more prominent than the English version, and the English version being more prominent than the French translated version. For example, the highest percentage language may be displayed near the top of the smart sign with the lowest percentage language being displayed near the bottom of the smart sign.

In another example, average aggregate location of each mobile device corresponding to a preferred language may be used to determine the display position. For example, as mentioned above, assume the viewable area in front of the smart sign is logically separated into a left-viewing section and a right-viewing section from the perspective of the users viewing the smart sign. Now assume that there are 10 mobile devices have a preferred language of German, 7 are in the left-viewing section and 3 are in the right viewing section, and 2 mobile devices that are in the right-viewing section have a preferred language of French. In this example, even though there are more mobile devices in the right viewing section with a preferred language of German compared to French, a majority of the mobile devices having a preferred language of German are in the left-viewing section. Accordingly, the German translated content should be displayed on the left side of the display screen of the smart sign so that it is easier to view by the majority and the French translated content should be displayed on the right side of the display screen of the smart sign, both being from the perspective of the users.

It should be understood that the above examples are not to be limiting, but are for illustrative purposes. Other mechanisms may be utilized to determine a graphical display position for each translated content based on the relative location of each mobile device or the number of mobile devices associated to each language.

Process 700 proceeds next to block 708, where one or more other visual characteristics of each translated content are modified. The visual characteristics that can be modified may include, but are not limited to, color, size, orientation, or other modifiable characteristics of the content. These modification can help display the translated content a way to distinguish one language from another or to emphasize one language over another, such as if there are more mobile devices associated with a particular language than other languages.

For example, in some embodiments, the highest percentage language may be displayed in larger text than other languages, where the lowest percentage language being displayed in the smallest text. In other embodiments, the highest percentage language may be displayed in a more vibrant color, such as bright yellow, than other languages. In yet other embodiments, if it is determined that the user is beyond some threshold distance from the smart sign, then the content may be enlarged until the user moves closer to the smart sign. In at least one such embodiment, the size of the content may slowly get smaller to track the movement of the mobile device as the user walks towards the smart sign. However, embodiments are not so limited and other visual characteristic modifications can be utilized.

After block 708, process 700 terminates or returns to a calling process to perform other actions.

Figure 8:
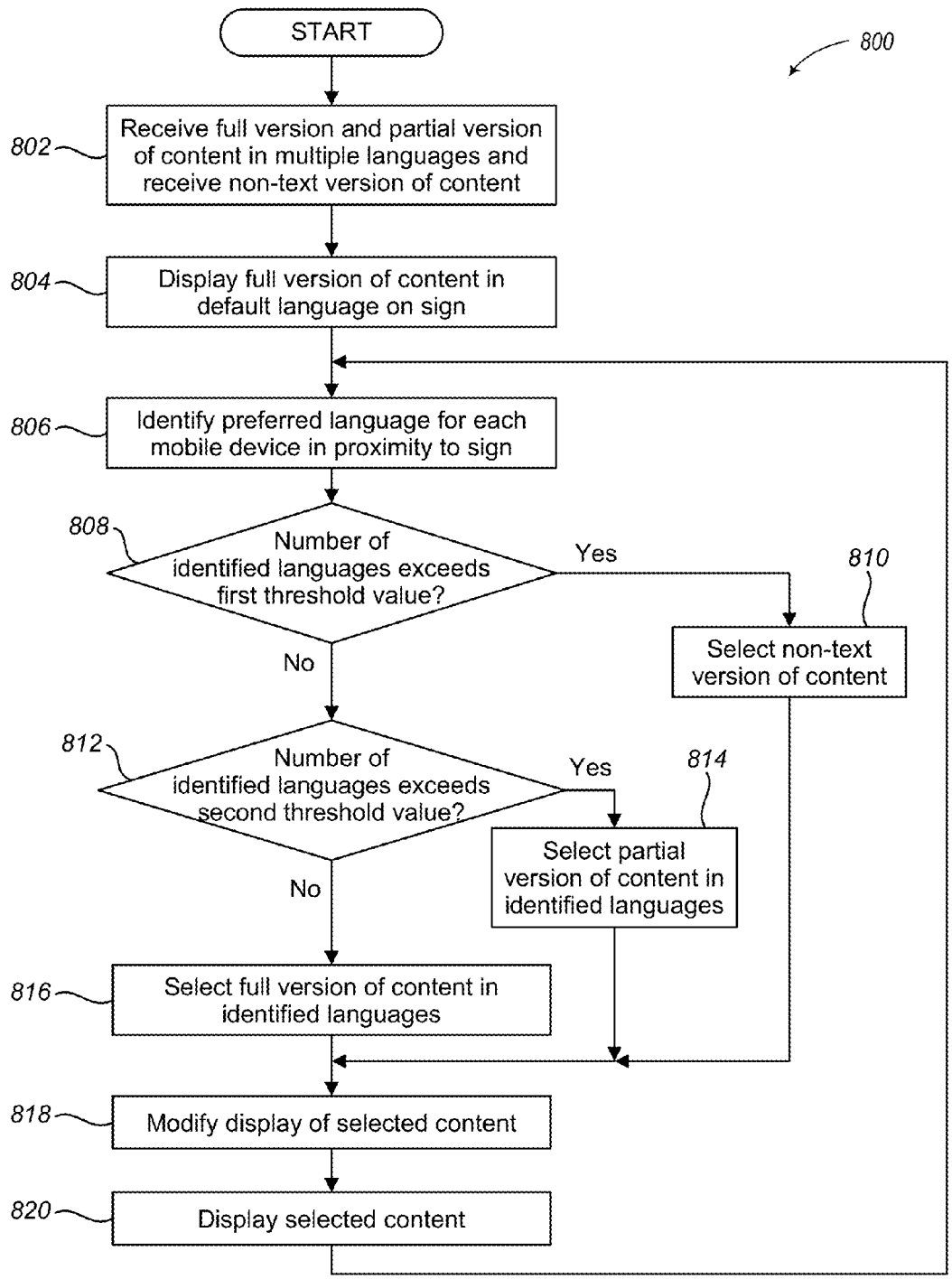
FIG. 8 illustrates a logical flow diagram generally showing one embodiment of a process for a dynamic-translation smart sign to perform real-time translations in accordance with embodiments described herein.

FIG. 8 illustrates a logical flow diagram generally showing one embodiment of a process for a dynamic-translation smart sign to perform real-time translations in accordance with embodiments described herein. In various embodiments, process 800 may be performed by a dynamic-translation smart sign 102, which may or may not have access to a real-time translation server 124.

Process 800 begins, after a start block, at block 802, where the smart sign receives and stores full versions of the content in a plurality of languages, partial versions of the content in the plurality of languages and a non-text version of the content. The smart sign can receive the content from the real-time translation server 124 or it can be pre-stored on the smart sign.

In various embodiments, each full version of content in each language has a corresponding partial version in each language. For example, assume content_A is to be displayed on the smart sign and the smart sign supports 10 languages. The smart sign receives 10 full versions of the content with one full version for each supported language, and 10 partial versions with one partial version for each supported language.

Similarly, the smart sign may receive or store a plurality of different content, where each separate content includes the corresponding full and partial versions in a plurality of different languages and a corresponding non-text version. For example, the smart sign may also receive and store content_B and content_C along with content_A. Accordingly, along with all the versions of content_A, the smart sign also receives 10 full versions of content_B, 10 partial versions of content_B, a non-text version of content_B, 10 full versions of content_C, 10 partial versions of content_C, and a non-text version of content_C. This allows the smart sign to change what content is displayed on the smart sign while also displaying it in multiple languages in different versions for each language based on the mobile devices that are in proximity to the smart sign.

The partial version of the content is generally a shorter version of the content so that more languages can simultaneously fit onto the smart sign at a given point in time. In some embodiments, the partial versions may also include additional graphics or images to help fill in the text that is not included in the partial version, such as an arrow illustrating the way to go rather than including the textual directions, such as illustrated in FIG. 4D.

In various embodiments, the partial version of the content may include one or more different partial versions of the content. For example, assume the full content is "The food court is Open and located next to Sports_4_Me." A first partial version may be "The food court is Open." A second partial version may be "The food court is Open" with an arrow point in the direction of the food court. And a third partial version may be an image of food and "Open." Again, each of these different versions is stored in each of the plurality of different supported languages. So in the example above with content_A, content_B, and content_C, the smart sign would not store 10 partial versions of each content, rather the smart sign would store 3 different partial versions for each supported language, or 30 partial versions for each content. However, other numbers and variations of partial versions may also be stored.

In some embodiments, the smart sign may receive and store one or more partial versions of the content in one or more languages with no full versions in those same languages. This option may be utilized when there is a limited amount of storage capacity on the smart sign and a low probability of using those languages.

The smart sign also receives a non-text version of the content. The non-text version of the content may be an image, picture, video, graphic, symbol, or the other non-language content that provides a universal meaning to people that speak different languages. For example, if the smart sign is to give directions to a restaurant, the non-text version of the content may be an image of food and an arrow pointing in the direction of the restaurant, such as illustrated in FIGS. 4E and 4F. In some embodiments, the non-text version may be combined with the full version or the partial version to provide additional information. For example, as mentioned above the one partial version may be an image of food and "Open." In this case, the image of food may be the non-text version of the content and "Open" may be the partial version of the content. In this way, the non-text content can be combined with or accompany the partial version of the content in multiple languages, such as "open" in multiple different languages.

Process 800 proceeds to block 804, where the smart sign displays the full version of the content in a default language.

The default language may be preprogrammed into the smart sign, or it may be provided by a server, such as real-time translation server 124.

Process 800 continues at block 806, where a preferred language for each mobile device in proximity to the smart sign is identified. In various embodiments, block 806 may employ embodiments block 604 to determine the preferred language of mobile devices in proximity to the smart sign.

Process 800 proceeds next to decision block 808, where a determination is made whether the number of different identified languages exceeds a first threshold value. In various embodiments, the first threshold is the maximum number of full versions or the partial versions of the content, or a combination thereof, that can be simultaneously displayed on the smart sign at a given point in time. For example, the smart sign may be able to display only three languages. But there may be 6 users in the proximity of the smart sign with 5 different preferred languages. Accordingly, the smart sign would be unable to display the content in all the different languages of the users in proximity to the smart sign. If the number of different identified languages exceeds the first threshold, then process 800 flows to block 810 to select the non-text version of the content; otherwise, process 800 flows to decision block 812.

At decision block 812, a determination is made whether the number of identified languages exceeds a second threshold value. In various embodiments, the second threshold is the maximum number of languages that can be displayed as full versions of the content on the smart sign at a given point in time. For example, the smart sign may be able to display only two full versions in different languages. But there may be three users in the proximity of the smart sign with three different preferred languages that are not the default language. Accordingly, the smart sign would be unable to display the full versions of the content in each different language of the users that are in proximity to the smart sign. If the number of different identified languages exceeds the second threshold, then process 800 flows to block 814 to select the partial versions of the content in the identified languages; otherwise, process 800 flows to decision block 816. In some embodiments, where there are multiple partial versions available. Additional threshold values may also be employed to determine which partial version to select based on the number of different identified languages.

At block 816 the full version of the content is selected in each identified language.

After the content is selected at blocks 810, 814, or 816, process 800 flows to block 818, where the display of the selected content is modified. In various embodiments, block 818 may employ embodiments of block 612 in FIG. 6 to modify the display of the content so that each version of the content is viewable to the users. Accordingly, some of the selected content may be larger or a different color than other content or positioned in a different area of the screen depending on the number of mobile devices for each identified language and their location relative to the smart sign.

Process 800 continues at block 820, where the selected content is displayed on the smart sign based on the modified display. In various embodiments, block 820 may employ embodiments of block 614 in FIG. 6 to display the content.

After block 820, process 800 loops to block 806 to continue to identify the preferred language for each mobile device that is in proximity to the smart sign and select and modify the content based on those identified languages. Since mobile devices can enter and leave the proximity of the smart sign, the number of mobile devices and the preferred languages in the proximity of the smart sign can be constantly changing. Accordingly, the smart sign dynamically changes what languages to display on the smart sign and whether the full version, partial version, or non-text version of the content is displayed and how to display that content.

Although FIG. 8 illustrates separately selecting the non-text version of the content, the full version of the content for all identified languages, or the partial version for all identified languages, embodiments are not so limited. Rather, one or more full versions for one or more of the identified languages may be selected in combination with one or more partial versions for the other identified languages. Similarly, one or more full versions or partial versions for one or more of the identified languages may be selected along with the non-text version of the content. The number of full or partial versions to select, and for which identified languages, may be based on the number of mobile devices associated with each identified language, their location relative to the smart sign, the size of each content, or a combination thereof.

If an identified language is not supported by the smart sign, i.e., the smart sign does not store a corresponding full version or partial version of the content, then the smart sign may select the non-text version to be displayed along with the other selected full or partial versions for the other identified languages that are supported by the smart sign.

In some embodiments, the smart sign may always show some version of the content in the default language. In at least one such embodiment, the identified languages may not include the default language since it will be displayed regardless of the preferred languages of other users in proximity to the smart sign. In other embodiments, the default language may only be displayed when the smart sign does not detect any mobile devices in proximity to the smart sign.

Figure 9:
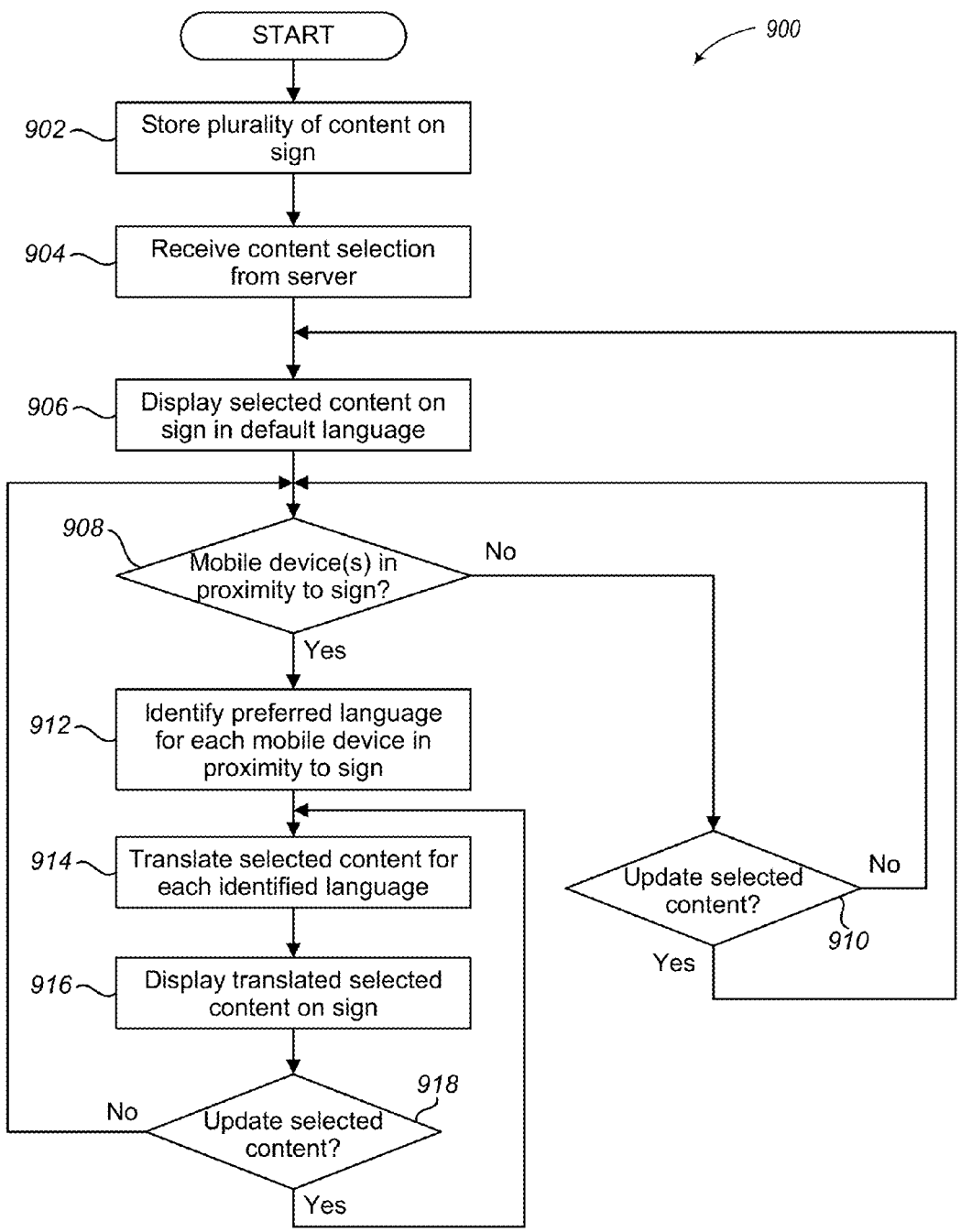
FIG. 9 illustrates a logical flow diagram generally showing one embodiment of an alternative process for a dynamic-translation smart sign to perform real-time translations in accordance with embodiments described herein.

FIG. 9 illustrates a logical flow diagram generally showing one embodiment of an alternative process for a dynamic-translation smart sign to perform real-time translations in accordance with embodiments described herein. In various embodiments, process 900 may be performed or executed by a dynamic-translation smart sign 102. As described above in FIG. 8, the smart sign may store full and partial versions of content in a plurality of different languages.

Process 900 begins, after a start block, at block 902, where a plurality of content is stored on the smart sign. In various embodiments, block 902 may employ embodiments of block 802 in FIG. 8 for the smart sign to receive and store a plurality of different content.

Process 900 proceeds to block 904, where the smart sign receives a content selection from the server. In various embodiments, the server may utilize third party information or other data that the smart sign does not have or does not have access to determine what content to select. For example, assume the smart sign is positioned in a football stadium. The smart sign may have player information stored on the smart sign in a plurality of different languages (e.g., at block 902). However, the smart sign may not directly know what player information to select and display. In one embodiment, an administrator may input into the server an identifier of which players are on the field. The server then provides player selection information to the smart sign so that the smart sign can display the player information for those players that are on the field. In another embodiment, the administrator may remotely input which players are on the field directly to the smart sign without the use of the server.

Process 900 continues to block 906, where the selected content is displayed in a default language. In various embodiments, block 906 may employ embodiments of block 804 in FIG. 8 to display the selected content on the smart sign in a default language.

Process 900 proceeds next to decision block 908, where a determination is made whether there are any mobile devices in proximity to the smart sign. In various embodiments, decision block 908 may employ embodiments of decision block 604 to determine if there are one or more mobile devices in proximity to the smart sign. If there are mobile devices in the proximity of the smart sign, then process 900 flows to block 912; otherwise, process 900 flows to decision block 910.

At decision block 910, a determination is made whether to update the selected content. In various embodiments, this determination is based on whether the smart sign has received a new content selection from the server. If a new content selection has been received by the smart sign, process 900 loops to block 906 to display the newly selected content in the default language; otherwise, process 900 loops to decision block 908 to continue to monitor for mobile devices entering or leaving the proximity of the smart sign.

If, at decision block 908, there are one or more mobile devices in proximity to the smart sign, process 900 proceeds from decision block 908 to block 912. At block 912, a preferred language is identified for each mobile device that is in proximity to the smart sign. In various embodiments, block 912 may employ embodiments of block 806 in FIG. 8 to identify each preferred language.

Process 900 proceeds to block 914, where the selected content is translated for each identified language. In some embodiments, block 914 may employ embodiments of block 610 in FIG. 6 to translate the selected content. In other embodiments, the full, partial, or non-text version, or a combination thereof of the selected content may be selected for each identified language similar to what is described above in conjunction with FIG. 8.

Process 900 continues to block 916, where the translated selected content is displayed on the smart sign. In various embodiments, block 916 may employ embodiments of block 614 to display the translated content on the smart sign. In some embodiments, the display of the translated selected content may also be modified similar to what is described above in conjunction with block 818 in FIG. 8.

Process 900 proceeds next to decision block 918, where a determination is made whether to update the selected content. In various embodiments, this determination is based on whether the smart sign has received a new content selection from the server. If a new content selection has been received by the smart sign, process 900 loops to block 914 to translate the newly selected content; otherwise, process 900 loops to decision block 908 to continue to monitor for mobile devices entering or leaving the proximity of the smart sign.

Figure 10:
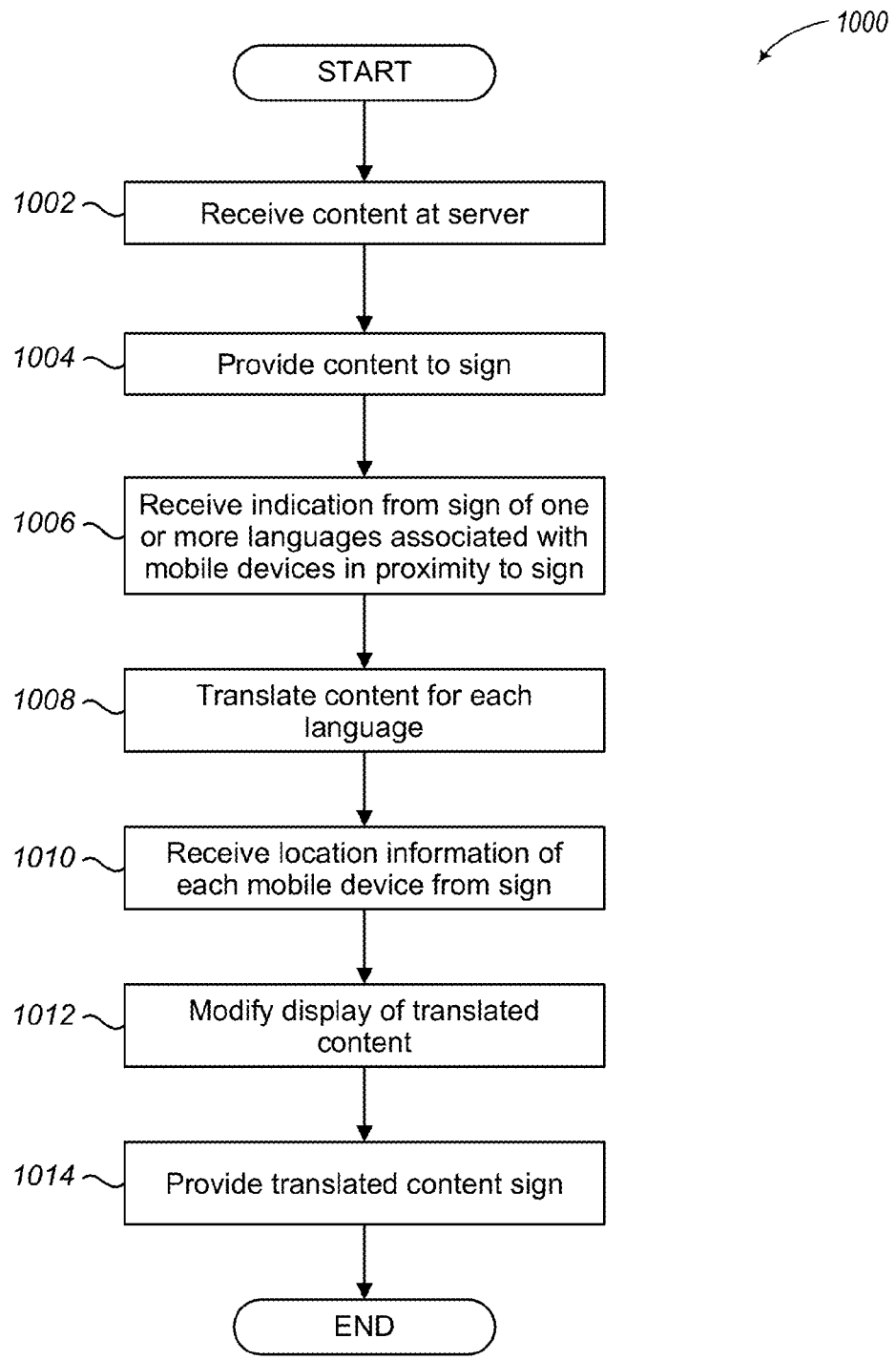
FIG. 10 illustrates a logical flow diagram generally showing one embodiment of a process for a real-time translation server to perform real-time translations for a smart sign in accordance with embodiments described herein.

FIG. 10 illustrates a logical flow diagram generally showing one embodiment of a process for a real-time translation server to perform real-time translations for a smart sign in accordance with embodiments described herein. In various embodiments, process 1000 may be performed or executed by a real-time translation server 124.

Process 1000 begins, after a start block, at block 1002, where content is received at the server. In various embodiments, block 1002 may employ embodiments similar to block 802 in FIG. 8, but where the content is received by the real-time translation server 124. In some embodiments, the content may be received in real-time from a third party.

Process 1000 proceeds to block 1004, where the server provides the content to the smart sign. In some embodiments, the content may be forwarded to the smart sign in real time as it is received.

Process 1000 continues at block 1006, where an indication of one or more languages is received from the smart sign. As described elsewhere herein, the smart sign determines the preferred language of each mobile device that is in proximity to the smart sign. In response to receiving the preferred language(s) of the mobile device(s), the smart sign sends an indication, such as a network message, to the server with the preferred languages of the mobile devices. In some embodiments, the indication lists the different preferred languages and how many mobile devices are associated with each mobile device.

Process 1000 proceeds next to block 1008, where the received content is translated into each language. In various embodiments, block 1008 may employ embodiments of block 610 in FIG. 6 to translate the content.

Process 1000 continues next at block 1010, where location information of each mobile device that is in proximity to the smart sign is received from the smart sign. As described elsewhere herein, the smart sign may determine a location of each mobile device using a variety of different directional technologies known to those skilled in the art. In response to determining the location of the mobile device(s), the smart sign sends the location information to the server. In some embodiments, the location information may be included with an indication of the preferred languages provided by the smart sign.

Process 1000 proceeds to block 1012, where the server modifies the display of one or more visual characteristics of the translated content based on the location of the mobile device relative to the smart sign or the number of mobile devices associated with each languages, or a combination thereof. In various embodiments, block 1012 may employ embodiments of block 612 in FIG. 6 to modify the display of the translated content.

Process 1000 continues to block 1014, where the translated content is provided to the smart sign. In some embodiments, the real-time translation server 124 provides the translated content to the smart sign for display along with instructions that define how the smart sign is to render the translated content based on the modified display. The smart sign can combine the translated content based on the received instructions and render the combined content on the display screen of the smart sign. In other embodiments, the real-time translation server 124 combines the translated content based on the modified display and provides an output data stream to the smart sign that is rendered by the smart sign.

After block 1014, process 1000 terminates or returns to a calling process to perform other actions. In some embodiments, if a mobile device leaves the proximity of the smart sign, if a new mobile device enters the proximity of the smart sign, or if a mobile device moves location relative to the smart sign, then the smart sign may provide an update to the server with the current preferred language(s), number of associated mobile devices, or mobile device locations so that the server can dynamically adjust the content translations, display location, or other visual characteristics of the content before the content is provided to the smart sign.

It should be understood that the embodiments described in the various flowcharts may be executed in parallel, in series, or in a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Figure 11:
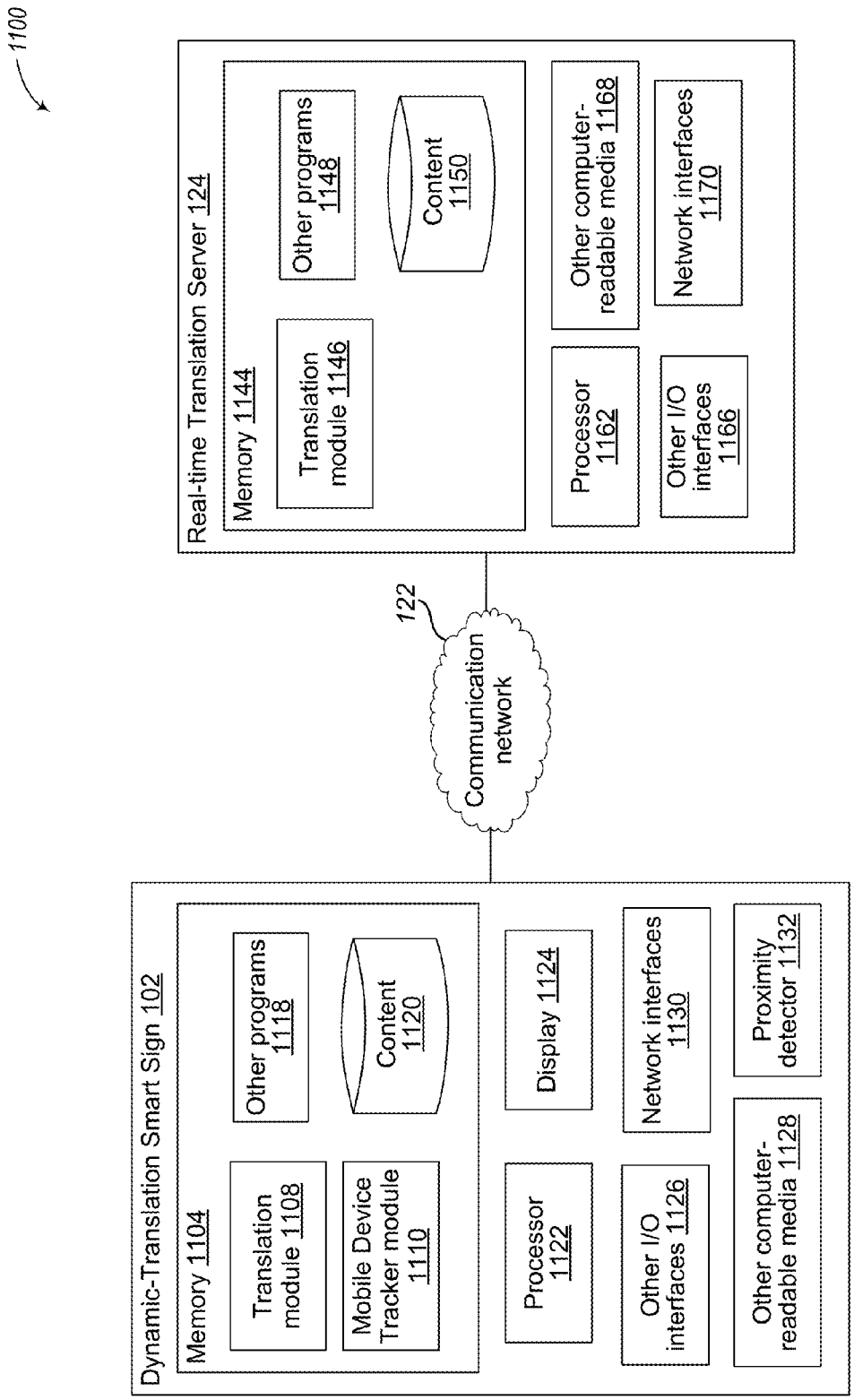
FIG. 11 shows a system diagram that describes one implementation of computing systems for implementing embodiments described herein.

FIG. 11 shows a system diagram that describes one implementation of computing systems for implementing embodiments described herein. System 1100 includes a dynamic-translation smart sign 102, a real-time translation server 124, and a communication network 122.

One or more special-purpose computing systems are used to implement the real-time translation server 124 to provide content to the dynamic-translation smart sign 102, and in some embodiments to translate the content, as described herein. Accordingly, various embodiments described herein may be implemented in software, hardware, firmware, or in some combination thereof. The real-time translation server 124 includes memory 1144, one or more processor 1162, I/O interfaces 1166, other computer-readable media 1168, and network interfaces 1170.

Processor 1162 includes one or more processing devices that execute instructions to perform actions, including at least some embodiments described herein. In various embodiments, the processor 1162 may include one or more central processing units (CPUs).

Memory 1144 may include one or more various types of non-volatile and/or volatile storage technologies. Examples of memory 1144 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. Memory 1144 may be utilized to store information, such as computer-readable instructions that are utilized by processor 1162 to perform actions, including at least some embodiments described herein.

Memory 1144 may have stored thereon various modules, such as translation module 1146, or other programs 1148. The translation module 1146 can provide content from the real-time translation server 124 to the dynamic-translation smart sign 102 via communication network 122. This content may be stored on the real-time translation server 124 or it can be received from another source or third party. In some embodiments, the translation module 1146 provides the content to the dynamic-translation smart sign 102. In other embodiments, the translation module 1146 performs real-time translations on the content before the translated content is provided to the dynamic-translation smart sign 102.

In various embodiments, the translation module 1146 can receive, via communication network 122, a variety of data and information from the dynamic-translation smart sign 102 to perform translations or graphical modifications to the content. In at least one of various embodiments, the translation module 1146 may receive the number of different languages of mobile device in proximity to the dynamic-translation smart sign 102, the preferred languages of those mobile devices, a location of those mobile devices relative to the dynamic-translation smart sign 102, or other information. In some embodiments, the translation module 1146 can utilize the information received from the dynamic-translation smart sign 102 to determine what content to display and in what language(s) or how that content or translated content is to be display by the dynamic-translation smart sign 102, for example by modifying one or more visual characteristics of the content, such as a screen location, size, color, or movement of each content that is to be displayed. The translation module 1146 can perform the translations or graphical modifications itself before providing the content to the dynamic-translation smart sign 102, or it can instruct the dynamic-translation smart sign 102 on what translations to perform, what pre-stored language to select, or how to display such content.

Memory 1144 may also store content 1150. In various embodiments, content may be received in real-time and provided to the dynamic-translation smart sign 102, or it may be stored on the real-time translation server 124. The content 1150 includes one or more different texts, logos, images, videos, audio files, or the like that are provided to the dynamic-translation smart sign 102. In some embodiments, the content 1150 includes a plurality of versions of each separate content, where each separate version is in a different language. In at least one embodiment, content 1150 may also include a non-text version of the content.

I/O interfaces 1166 may include interfaces for various other input or output devices, such as audio interfaces, display interfaces, other video interfaces, USB interfaces, or the like. Other computer-readable media 1168 may include other types of stationary or removable computer-readable media, such as removable flash drives, external hard drives, or the like. Network interfaces 1170 are configured to communicate with other computing devices, such as dynamic-translation smart sign 102 via communication network 122.

One or more special-purpose computing systems are used to implement dynamic-translation smart sign 102 to determine the preferred language of mobile devices that are in close proximity to the implement dynamic-translation smart sign 102, and in some embodiments translate the content or modify one or more visual characteristics of the content, as described herein. Accordingly, various embodiments described herein may be implemented in software, hardware, firmware, or in some combination thereof. Dynamic-translation smart sign 102 includes memory 1104, processor 1122, display 1124, I/O interfaces 1126, other computer-readable media 1128, network interface 1130, and proximity detector 1132.

Processor 1122 includes one or more processing devices that execute instructions to perform actions, including at least some embodiments described herein. In various embodiments, the processor 1122 may include one or more central processing units (CPUs).

Memory 1104 may include one or more various types of non-volatile and/or volatile storage technologies. Examples of memory 1104 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. Memory 1104 may be utilized to store information, including computer-readable instructions that are utilized by processor 1122 to perform actions, including at least some embodiments described herein.

Memory 1104 may have stored thereon various modules, such as translation module 1108 and mobile device tracker module 1110, or other programs 1118. The mobile device tracker module 1110 utilizes the proximity detector 1132 to determine and track mobile devices that are in close proximity to the dynamic-translation smart sign 102. In some embodiments, the mobile device tracker module 1110 obtains the preferred language and location of those mobile devices. The translation module 1108 can perform real-time translation on content based on the preferred language and location of the mobile devices that are in proximity to the dynamic-translation smart sign 102. In some embodiments, the translation module 1108 performs the translations on content that is stored on the dynamic-translation smart sign 102 or received from the real-time translation server 124 via communication network 122. In other embodiments, the translation module 1108 or the mobile device tracker module 1110 provides the language and location data to the real-time translation server 124 via the communication network 122. The dynamic-translation smart sign 102 then receives the translated content or instructions on what content to display, in what language the content should be in, and how to graphically modify the translated content.

Memory 1104 may also store content 1120. In various embodiments, content may be received from the real-time translation server 124 in real-time, or it may be stored on the dynamic-translation smart sign 102. The content 1120 may store content similar content 1150. In some embodiments, the content 1120 includes a plurality of versions of each separate content, where each separate version is in a different language. In at least one embodiment, content 1120 may also include a non-text version of the content.

Proximity detector 1132 is a device capable of detecting the presence of one or more mobile devices that are in close proximity or within a predetermined range of the dynamic-translation smart sign 102. In some embodiments, the proximity detector 1132 is configured to receive signals, such as via Near Field Communication (NFC) protocols, Bluetooth Low Energy (BLE) protocols, Radio-frequency identification (RFID) technology, or other short-range communication technologies. In some embodiments, the dynamic-translation smart sign 102 communicates with the mobile devices to receive various user settings, such as preferred language, from the mobile devices. In some embodiments, the proximity detector 1132 can determine range and direction of signals from the mobile devices utilizing a variety of ranging techniques known to those skilled in the art. This information is used by the mobile device tracker module 1110 to determine a location of each corresponding mobile device and whether the mobile device is moving or has exited the proximity of the dynamic-translation smart sign 102.

Display 1124 is a display device capable of rendering content to a user. The display 1124 may be a liquid crystal display, light emitting diode, or other type of display device, and include a touch sensitive screen capable of receiving inputs from a user's hand, stylus, or other object.

I/O interfaces 1126 may include interfaces for various other input or output devices, such as audio interfaces, other video interfaces, USB interfaces, or the like. Other computer-readable media 1128 may include other types of stationary or removable computer-readable media, such as removable flash drives, external hard drives, or the like. Network interfaces 1130 are configured to communicate with other computing devices, such as real-time translation server 124 via communication network 122.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
    a memory that stores visual content in multiple different languages;
    a display device that displays the visual content;
    a proximity device in communication with a processor to determine when one or more mobile devices is in a field-of-view area of the display device;
    a communication interface that communicates with the one or more mobile devices to receive a preferred language of each of the one or more mobile devices, the preferred language of each corresponding mobile device is a previously set preference of the corresponding mobile device; and
    wherein the processor performs actions, including:
        providing the visual content from the memory in a first language to the display device to be rendered on the display device;
        determining a number of preferred languages for the one or more mobile devices that are in the field-of-view area of the display device; and
        generating, from the visual content in the memory, translated content in each preferred language of the one or more mobile devices by selecting a partial version or a full version of the visual content in each preferred language based on the determined number of preferred languages; and
        providing each translated content to the display device to be rendered on the display device.

2. The system of claim 1, wherein the visual content includes text only.

3. The system of claim 1, wherein generating the translated content includes:
    employing a machine translator to translate the visual content into each preferred language of the one or more mobile devices that are in the field-of-view area of the display device.

4. The system of claim 1, wherein generating the translated content includes:
    selecting previously translated versions of the visual content for each preferred language of the one or more mobile devices that are in the field-of-view area of the display device.

5. The system of claim 1, wherein generating the translated content includes:
    determining a number of preferred language of the one or more mobile devices;
    selecting a graphics only version versions of the visual content to be displayed on the display device in response to the number of preferred languages being above a threshold value.

6. The system of claim 1, wherein the processor performs further actions, comprising:
    determining a location of each of the one or more mobile devices relative to the display device;
    determining a graphical position on the display device for each translated content based on the location of the one or more mobile devices;
    customizing a display output to simultaneously rendered each translated content on the display device based on the determined graphical position for each translation; and
    providing the customized display output to the display device to be rendered on the display device.

7. The system of claim 1, wherein the processor performs further actions, comprising:
- determining a number of mobile devices for each preferred language of the one or more mobile devices;
- determining a graphical position on the display device for each translated content based on the determined number of mobile devices for each preferred language; and
- providing each translated content to the display device to be simultaneously rendered on the display device based on the determined graphical position for each translation.

8. The system of claim 1, wherein the processor performs further actions, comprising:
- determining a number of mobile devices for each preferred language of the one or more mobile devices;
- determining a location of each of the one or more mobile devices relative to the display device;
- determining a graphical position on the display device for each translated content based on the determined number of mobile devices for each preferred language and the determined location of the one or more mobile devices; and
- providing each translated content to the display device to be simultaneously rendered on the display device based on the determined graphical position for each translated content.

9. A method comprising:
- displaying audiovisual content in a first language on a display screen of a smart sign;
- determining that a mobile device is in proximity to the smart sign;
- determining a location of the mobile device relative to the display screen of the smart sign;
- receiving device-specific information from the mobile device, including a preferred language of a user of the mobile device;
- translating the displayed audiovisual content based on the preferred language of the user; and
- modifying at least one visual characteristic of the translated audiovisual content based on the location of the mobile device;
- displaying the translated audiovisual content on the display screen of the smart sign based on the at least one modified visual characteristic.

10. The method of claim 9, further comprising:
- determining that the mobile device has exited the proximity of the smart sign; and
- redisplaying the audiovisual content in the first language in response to the mobile device exiting the proximity of the smart sign.

11. The method of claim 9, wherein displaying the translated audiovisual content further comprises:
- modifying a graphical position at which to display the translated audiovisual content based on the location of the mobile device; and
- displaying the translated audiovisual content on the display screen of the smart sign based on the modified graphical position.

12. The method of claim 9, wherein displaying the translated audiovisual content further comprises:
- determining a movement of the mobile device while in the proximity of the smart sign; and
- displaying the translated audiovisual content on the display screen of the smart sign in a manner where the displayed translated audiovisual content tracks across the display screen based on the movement of the mobile device.

13. The method of claim 9, further comprising:
- determining that a movement of the mobile device is in a direction of a second smart sign; and
- providing the preferred language of the user to the second smart sign for the second smart sign to translate and display other audiovisual content in the preferred language prior to the mobile device entering a proximity of the second smart sign.

14. The method of claim 9, further comprising prior to the mobile device entering the proximity of the smart sign:
- receiving an indication that the mobile device is moving toward the smart sign, the indication including the preferred language of the user;
- generating the translated audiovisual content into the preferred language of the user;
- determining a graphical position at which to display the translated audiovisual content based on a known location of the smart sign relative to the mobile device; and
- displaying the translated audiovisual content on the display screen of the smart sign based on the determined graphical position.

15. The method of claim 9, further comprising:
- determining that a second mobile device is in the proximity of the smart sign while the mobile device is still in the proximity of the smart sign;
- receiving second device-specific information from the second mobile device, including a second preferred language of a second user of the second mobile device;
- determining another location of the second mobile device relative to the display of the smart sign;
- generated second translated audiovisual content by automatically translating the audiovisual content into the second preferred language; and
- displaying the translated audiovisual content and the second translated audiovisual content on the display of the smart sign based on the location of the mobile device and the other location of the second mobile device.

16. The method of claim 9, further comprising:
- determining a movement of the mobile device relative to the smart sign; and
- instructing a motor to move the display screen of the smart sign to track the movement of the mobile device.

17. The method of claim 9, further comprising:
- determining a language associated with each of a plurality of mobile devices that are in the proximity of the display screen of the smart sign;
- translating the audiovisual content into each language associated with the plurality of mobile devices; and
- displaying each translation of the audiovisual content on the display screen.

18. The method of claim 9, further comprising:
- determining a language associated with each of a plurality of mobile devices that are in the proximity of the display screen of the smart sign;
- determining a location of each of the plurality of mobile devices relative to the display screen;
- translating the audiovisual content into each language associated with the plurality of mobile devices;
- determining a graphical position on the display screen for each translation of the audiovisual content based on the location of the plurality of mobile devices; and
- displaying each translation of the audiovisual content on the display screen based on the determined graphical position for each translation.

19. The method of claim 9, further comprising:
determining a number of languages associated with each of a plurality of mobile devices that are in the proximity of the display screen of the smart sign; and
displaying a non-text version of the audiovisual content when the number of languages exceeds a predetermined threshold.

20. The method of claim 9, further comprising:
determining a language associated with each of a plurality of mobile devices that are in the proximity of the display screen of the smart sign; and
displaying partial versions of the audiovisual content in the each of the determined languages when a number of determined languages exceeds a threshold value.

21. A method, comprising:
receiving content to display on a smart sign, the content is in a default language;
receiving, from the smart sign, an indication of a mobile device that is in proximity to the smart sign, a preferred language of a user of the mobile device, and a location of the mobile device relative to the smart sign;
translating the content into the preferred language of the user;
determining at least one visual characteristic for the translated content based on the location of the mobile device;
providing the translated content to the smart sign for display based on the at least one visual characteristic;
receiving, from the smart sign, an indication that a plurality of mobile devices are now in proximity to the smart sign and a total number of preferred languages of users of the plurality of mobile devices; and
providing a non-text version of the content to the smart sign for display in response to the number of preferred languages exceeds a predetermined threshold.

22. The method of claim 21, wherein determining the at least one visual characteristic for the translated content further comprises:
determining a graphical position at which to display the translated content based on the location of the mobile device.

23. The method of claim 21, further comprises:
determining a first size at which to display the translated content and a second size at which to display the content in the default language; and
providing the translated content and the content in the default language to the smart sign for display based on the determined first and second sizes.

24. The method of claim 21, wherein displaying the translated content further comprises:
receiving, from the smart sign, a movement of the mobile device;
determining a screen movement for the translated content based on the movement of the mobile device; and
providing the translated content to the smart sign for display based on the determined screen movement.

25. The method of claim 21, further comprising:
receiving, from the smart sign, a movement of the mobile device;
determining that the mobile device is moving towards a second smart sign;
translating other content for the second smart sign into the preferred language of the user; and
providing the translated other content to the second smart sign for display before the mobile device enters a proximity of the second smart sign.

26. The method of claim 21, further comprising:
receiving, from the smart sign, an indication of a second mobile device that is in the proximity of the smart sign, a second preferred language of a second user of the second mobile device, and a second location of the second mobile device relative to the smart sign;
translating the content into the second preferred language of the second user; and
providing the translated content in the preferred language and in the second preferred language to the smart sign for simultaneous display based on the location of the mobile device relative to the second location of the second mobile device.

27. The method of claim 21, further comprising:
in response to the number of preferred languages failing to exceed the predetermined threshold:
translating the content into each preferred language associated with the plurality of mobile devices; and
providing the translated content in each preferred language to the smart sign for display.

28. A method, comprising:
receiving first content to display on a first smart sign and second content to display on a second smart sign, the first content and the second content are in a default language;
receiving, from the first smart sign, an indication of a mobile device that is in proximity to the first smart sign, a preferred language of a user of the mobile device, and a movement of the mobile device;
translating the first content into the preferred language of the user;
providing the translated first content to the first smart sign for display to the user;
determining that the mobile device is moving towards the second smart sign based on the movement of the mobile device;
translating the second content into the preferred language of the user; and
providing, before the mobile device enters a proximity of the second smart sign, the translated second content to the second smart sign for display to the user.

* * * * *

UNITED STATES PATENT AND TRADEMARK OFFICE
CERTIFICATE OF CORRECTION

PATENT NO. : 9,785,632 B1
APPLICATION NO. : 15/153542
DATED : October 10, 2017
INVENTOR(S) : Travis Lee Beaven et al.

It is certified that error appears in the above-identified patent and that said Letters Patent is hereby corrected as shown below:

In the Claims

Column 32, Line 50 Claim 5:
"selecting a graphics only version versions of the visual"
Should read:
--selecting a graphics only version of the visual--.

Signed and Sealed this
Third Day of July, 2018

Andrei Iancu
*Director of the United States Patent and Trademark Office*